US012033458B2

(12) United States Patent
Ocampo et al.

(10) Patent No.: US 12,033,458 B2
(45) **Date of Patent: *Jul. 9, 2024**

(54) GAMING MACHINE AND MODULAR CABINET SYSTEM FOR USE WITH GAMING MACHINES

(71) Applicant: Konami Gaming, Inc., Las Vegas, NV (US)

(72) Inventors: Samuel Ocampo, Las Vegas, NV (US); Norio Tone, Las Vegas, NV (US)

(73) Assignee: Konami Gaming, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 17/983,292

(22) Filed: Nov. 8, 2022

(65) Prior Publication Data

US 2023/0177913 A1 Jun. 8, 2023

Related U.S. Application Data

(63) Continuation of application No. 17/064,021, filed on Oct. 6, 2020, now Pat. No. 11,544,992.

(60) Provisional application No. 62/914,152, filed on Oct. 11, 2019.

(51) Int. Cl.
*G07F 17/32* (2006.01)

(52) U.S. Cl.
CPC ...... *G07F 17/3216* (2013.01); *G07F 17/3211* (2013.01)

(58) Field of Classification Search
CPC .......................... G07F 17/3211; G07F 17/3216
See application file for complete search history.

(56) References Cited

U.S. PATENT DOCUMENTS

| | | | | |
|---|---|---|---|---|
| 10,825,286 | B2 * | 11/2020 | Gallagher | G07F 17/3202 |
| 10,872,490 | B2 * | 12/2020 | Winston | G06F 1/1624 |
| 11,544,992 | B2 * | 1/2023 | Ocampo | G07F 17/3216 |
| 2008/0055491 | A1 * | 3/2008 | Gordon | G07F 17/3216 463/20 |
| 2008/0265503 | A1 * | 10/2008 | Wudtke | G07F 17/3216 273/138.2 |
| 2010/0124994 | A1 * | 5/2010 | O'Keene | G07F 17/3216 463/46 |

(Continued)

*Primary Examiner* — Jasson H Yoo

(74) *Attorney, Agent, or Firm* — Howard & Howard Attorneys PLLC

(57) ABSTRACT

A gaming machine including a modular cabinet system is described herein. The modular cabinet system includes a cabinet stand assembly, a control unit housing mounted on the cabinet stand assembly, and a display unit support assembly mounted to the control unit housing. The control unit housing defines an interior cavity enclosing a game control unit assembly of the gaming machine. The display unit support assembly includes a primary display support member and a primary bracket assembly slidably coupled to the primary display support member. The primary display support member defines an interior equipment cavity configured to receive the primary bracket assembly therein. The primary bracket assembly is coupled to a primary display unit of the gaming machine to support the primary display unit from the primary display support member and to allow the primary display unit to move with respect to the primary display support member.

20 Claims, 23 Drawing Sheets

(56) References Cited

U.S. PATENT DOCUMENTS

| | | | | |
|---|---|---|---|---|
| 2010/0197397 | A1* | 8/2010 | Graf | G07F 17/3211 463/31 |
| 2016/0335836 | A1* | 11/2016 | Castro | G07F 17/3211 |
| 2018/0053373 | A1* | 2/2018 | Goldstein | G07F 17/3213 |
| 2018/0061142 | A1* | 3/2018 | Kukita | G07D 7/003 |
| 2018/0190068 | A1* | 7/2018 | Priddy | G07F 17/3211 |
| 2019/0012874 | A1* | 1/2019 | Goldstein | G07F 17/3218 |
| 2019/0102984 | A1* | 4/2019 | Gallagher | G07F 17/3216 |
| 2020/0090461 | A1* | 3/2020 | Tillery | G06Q 50/34 |

* cited by examiner

GAMING MACHINE AND MODULAR CABINET SYSTEM FOR USE WITH GAMING MACHINES

CROSS-REFERENCE TO RELATED APPLICATION

This application is a continuation of U.S. patent application Ser. No. 17/064,021, filed Oct. 6, 2020, which claims the benefit of U.S. Provisional Patent Application No. 62/914,152, filed Oct. 11, 2019, the disclosures of which are hereby incorporated by reference in their entirety.

FIELD OF THE INVENTION

The present invention relates to gaming machines and more specifically, to a modular cabinet system for use with gaming machines.

BACKGROUND OF THE INVENTION

A gaming machine represented by a slot machine is highly popular among casino customers as a device that provides gaming that is easy to enjoy, and recent statistics report that sales from gaming machines account for the majority of casino earnings. At least some known gaming machines include a gaming cabinet enclosing a game control unit and supports a button display and one or more display monitors. Known gaming cabinets are designed to support predesigned display monitor configurations. As such, changes to the display monitor configurations are difficult and expensive. A gaming machine that enables changes in display monitor configurations is desired. The present invention addresses one or more of the aforementioned challenges.

SUMMARY OF THE INVENTION

In different embodiments of the present invention, a gaming machine and a modular cabinet system for use with gaming machines, are provided.

In one aspect of the present invention, a gaming machine is provided. The gaming machine includes a display unit assembly including a primary display unit, a game control unit assembly, a control panel assembly, and a modular cabinet system. The modular cabinet system includes a cabinet stand assembly supported on a ground surface, a control unit housing mounted on the cabinet stand assembly, and a display unit support assembly mounted on the control unit housing. The control unit housing is configured to support the control panel assembly and includes an inner surface that defines an interior cavity enclosing the game control unit assembly. The display unit support assembly includes a primary display support member mounted to the control unit housing and a primary bracket assembly slidably coupled to the primary display support member. The primary display support member includes an inner surface that defines an interior equipment cavity configured to receive the primary bracket assembly therein. The primary bracket assembly includes a plurality of primary display unit sliding bracket assemblies that are coupled to the inner surface of the primary display support member and a primary display unit support bracket that is coupled to the plurality of primary display unit sliding bracket assemblies to allow the primary display unit support bracket to move with respect to the primary display support member. The primary display unit support bracket is coupled to the primary display unit to support the primary display unit from the primary display support member and to allow the primary display unit to move with respect to the primary display support member.

In another aspect of the present invention, a modular cabinet system for use with a gaming machine is provided. The modular cabinet system includes a cabinet stand assembly supported on a ground surface, a control unit housing mounted on the cabinet stand assembly, and a display unit support assembly mounted to the control unit housing. The control unit housing includes an inner surface that defines an interior cavity enclosing a game control unit assembly of the gaming machine. The display unit support assembly includes a primary display support member mounted to the control unit housing and a primary bracket assembly slidably coupled to the primary display support member. The primary display support member includes an inner surface that defines an interior equipment cavity configured to receive the primary bracket assembly therein. The primary bracket assembly includes a plurality of primary display unit sliding bracket assemblies that are coupled to the inner surface of the primary display support member and a primary display unit support bracket that is coupled to the plurality of primary display unit sliding bracket assemblies to allow the primary display unit support bracket to move with respect to the primary display support member. The primary display unit support bracket is coupled to a primary display unit of the gaming machine to support the primary display unit from the primary display support member and to allow the primary display unit to move with respect to the primary display support member.

BRIEF DESCRIPTION OF DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

DETAILED DESCRIPTION OF EMBODIMENTS

Figure 1:
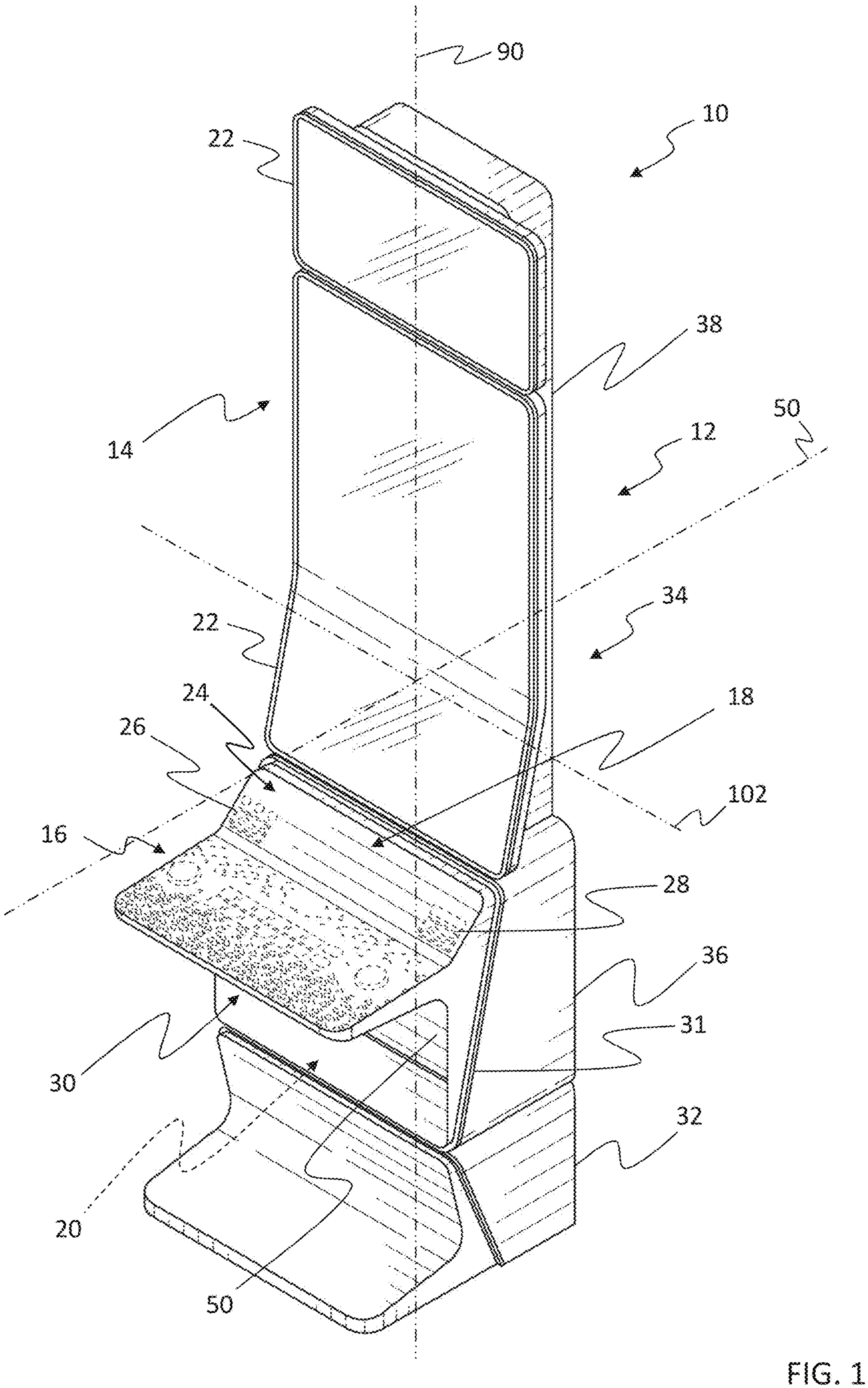
FIGS. 1-3 are perspective views of a gaming machine including a modular gaming cabinet system, according to an embodiment of the present invention.
Figure 2:
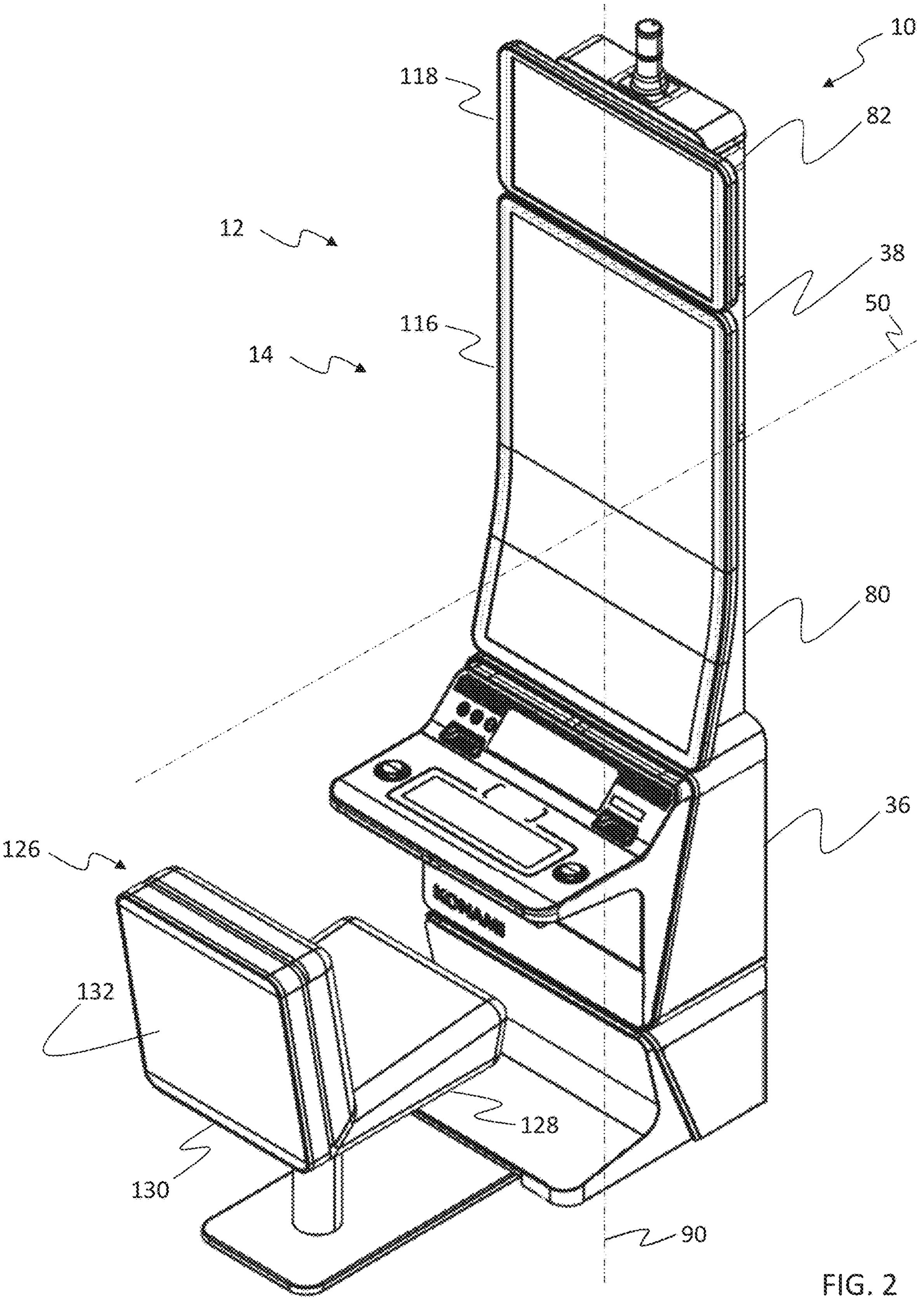
Figure 3:
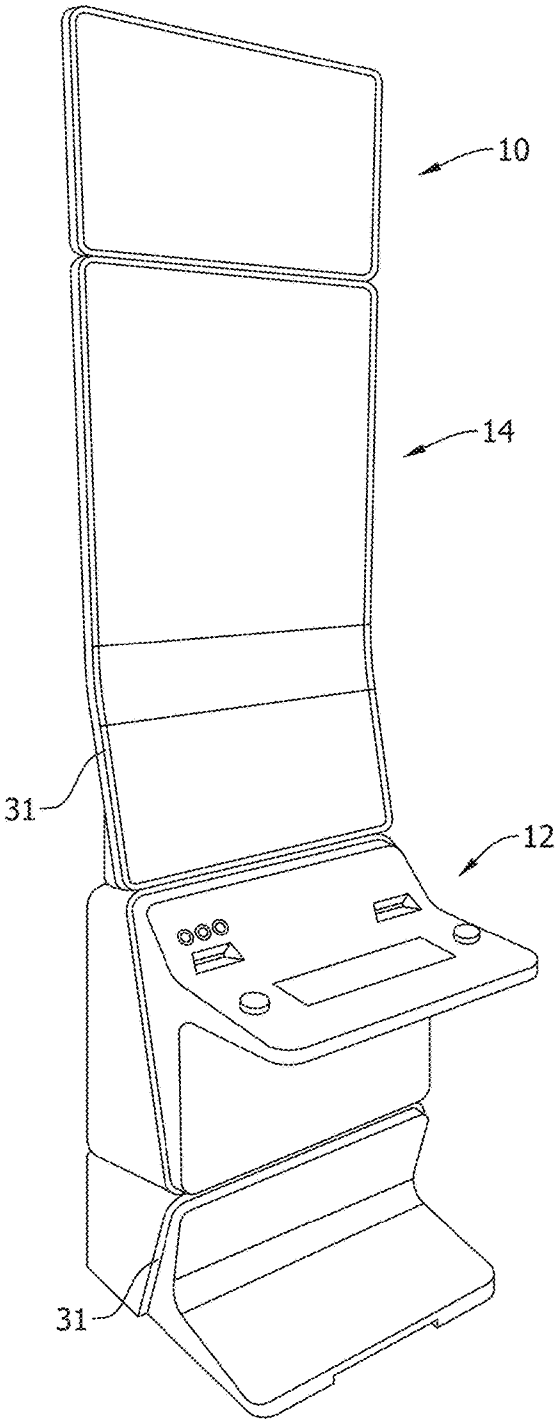
Figure 4:
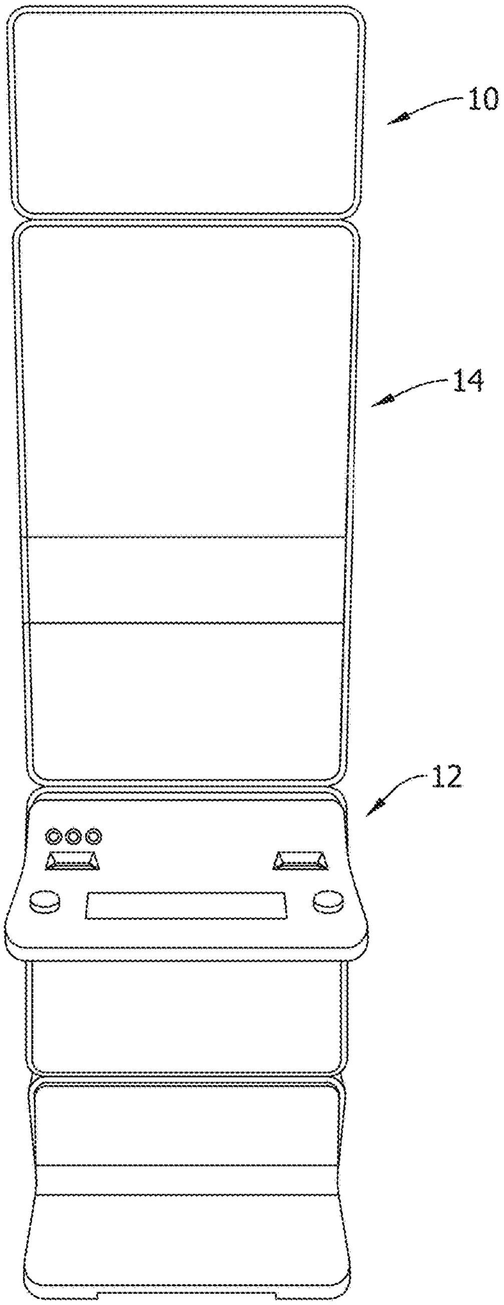
FIG. 4 is a front view of the gaming machine shown in FIGS. 1-3.
Figure 5:
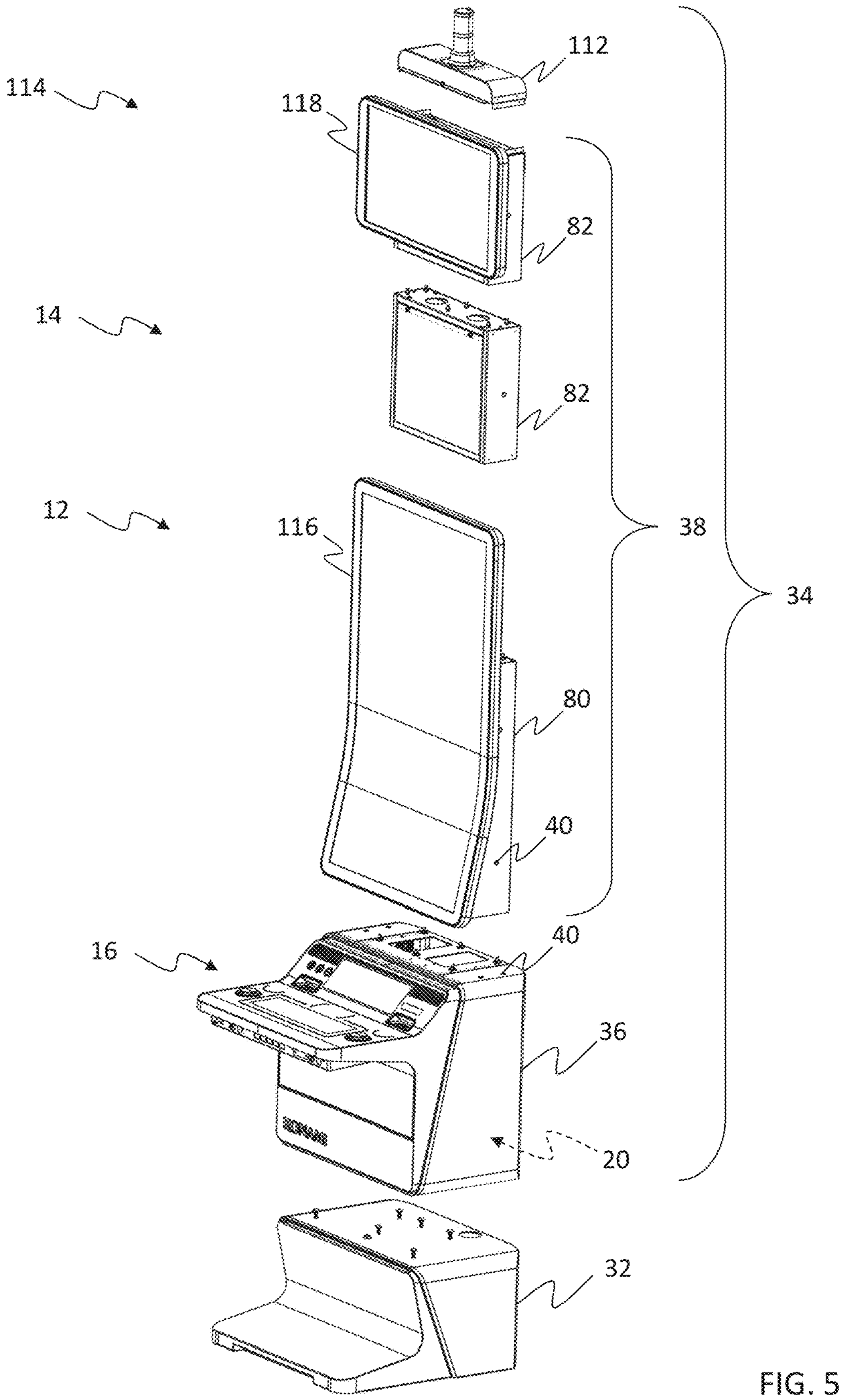
FIGS. 5 and 6 are exploded perspective views of the modular gaming cabinet system.
Figure 6:
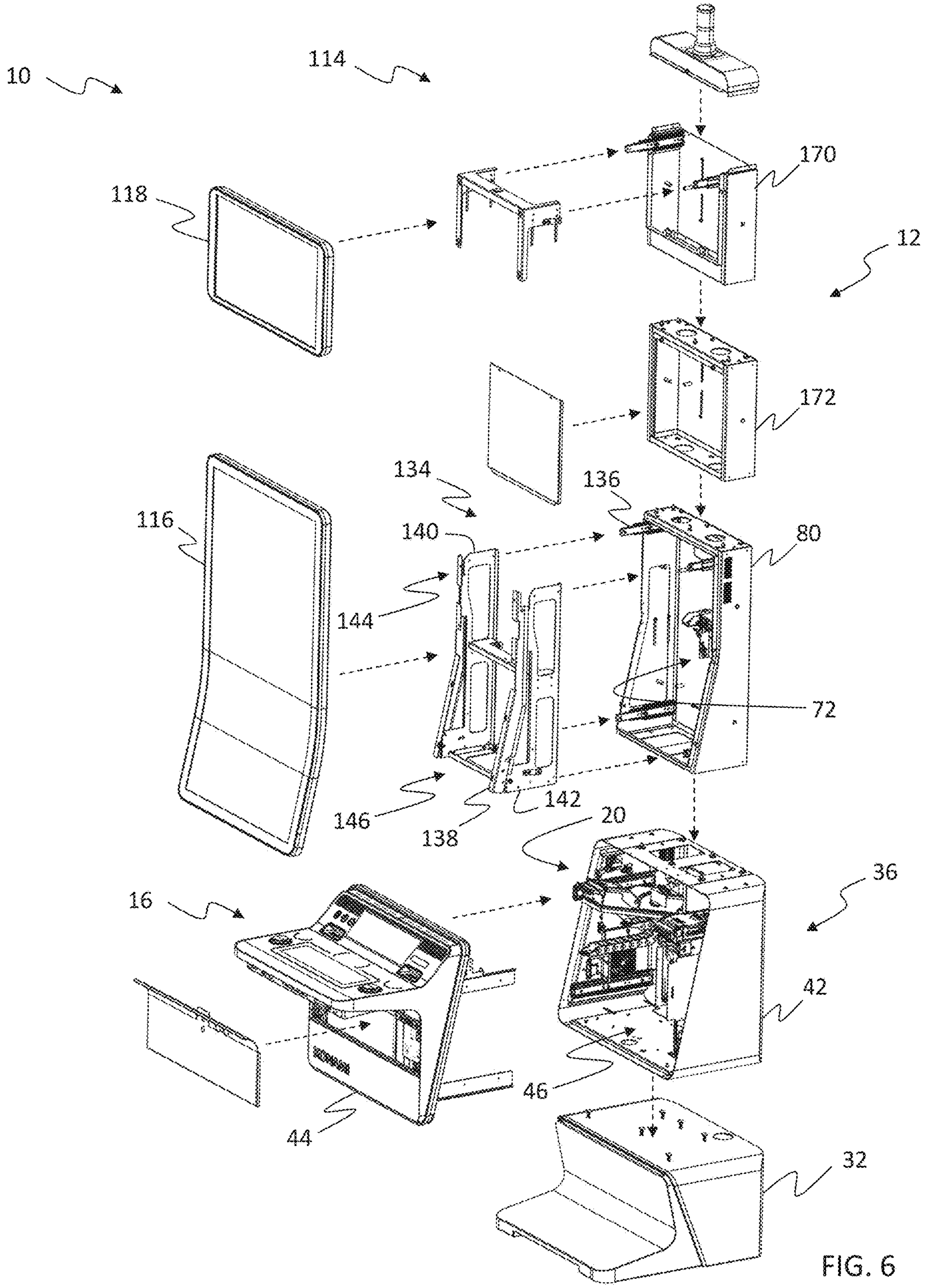
Figure 7:
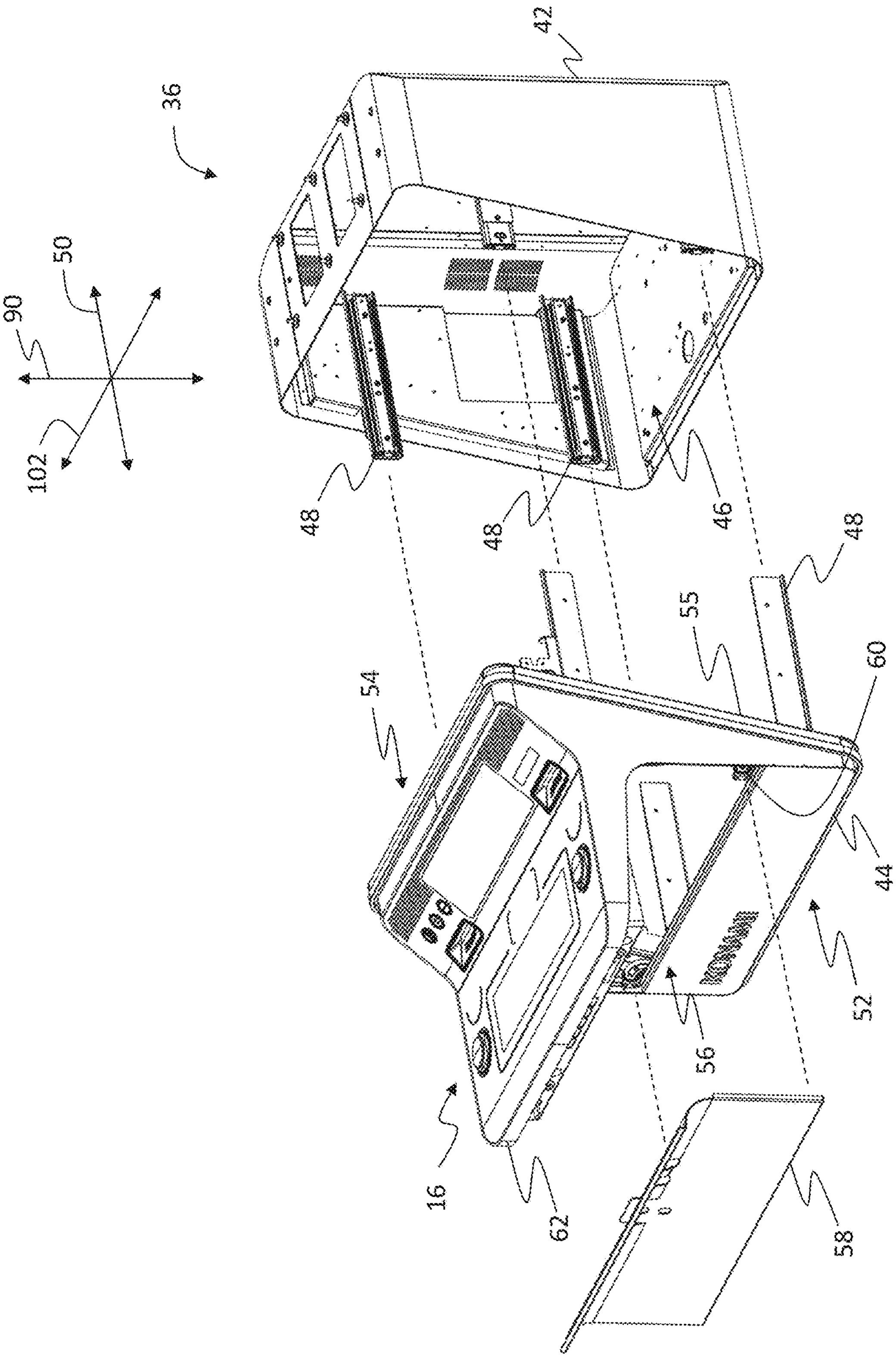
FIG. 7 is an exploded perspective view of a control unit housing that may be used with the modular gaming cabinet system.
Figure 8:
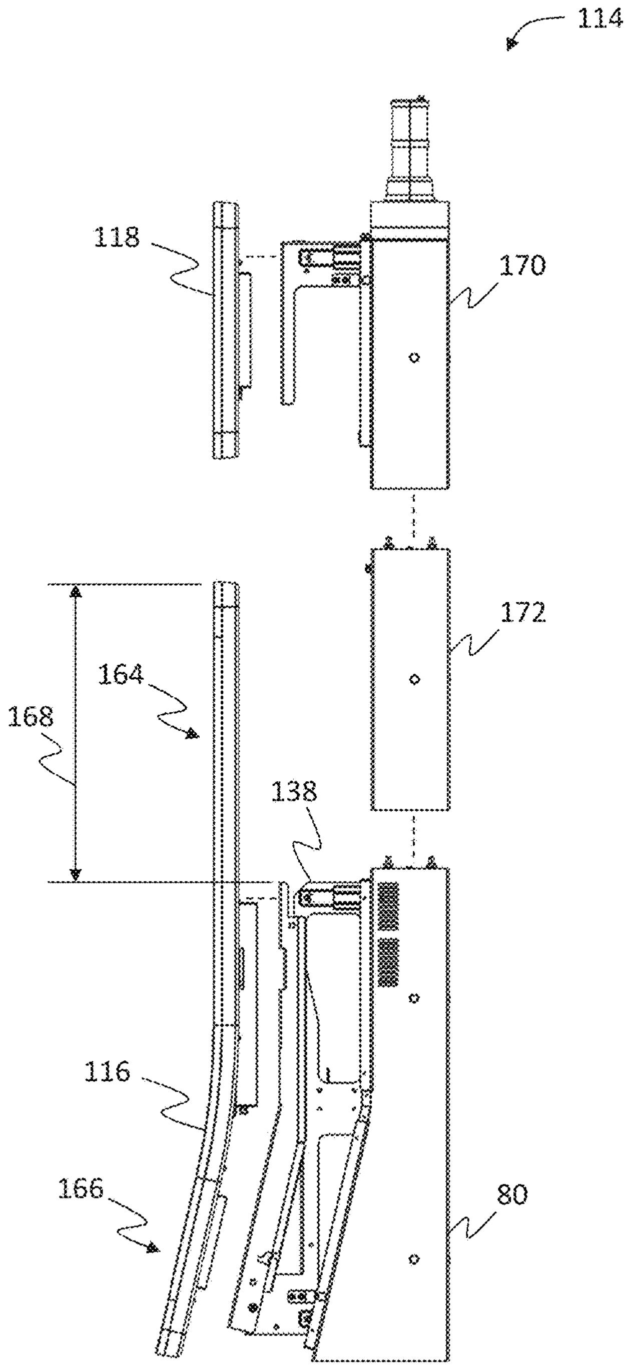
FIG. 8 is an exploded side view of a display unit support assembly shown in a first configuration that may be used with the modular gaming cabinet system.
Figure 9:
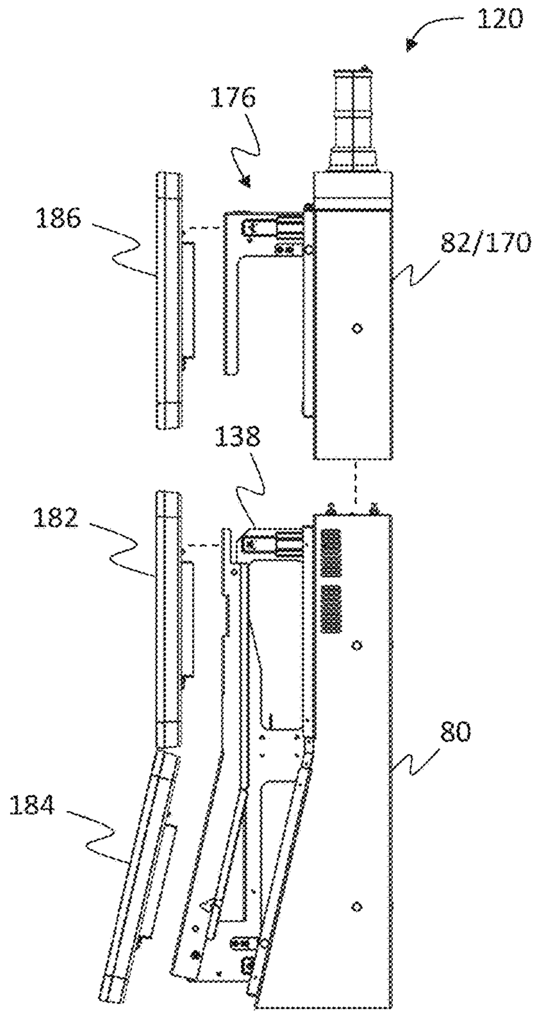
FIG. 9 is an exploded side view of the display unit support assembly shown in a second configuration that may be used with the modular gaming cabinet system.

With reference to the drawings, and in operation, the present invention is directed towards a gaming machine and a modular gaming cabinet system for use with gaming machines. The present invention improves the functionality of existing gaming machines by providing a modular gaming cabinet system that provides various configurations for gaming machine display units to accommodate various game themes and game play using one or more display units. By providing a modular gaming cabinet system, the present invention improves flexibility in the design and manufacturing of gaming machine cabinets thus reducing overall operational costs and manpower.

Referring to FIGS. 1-31, in the illustrated embodiment, the gaming machine 10 includes a modular cabinet system 12 that supports a display unit assembly 14, a control panel assembly 16, and may also house a player tracking or ranking unit 18. The modular cabinet system 12 also houses a game control unit assembly 20 that controls each part of the gaming machine 10.

The display unit assembly 14 may include one or more display units 22 which may include liquid crystal display devices and/or organic EL display devices and the like, that are controlled by the game control unit assembly 20 to display a game to a player.

Speakers 24 are provided, and by controlling via the game control unit assembly 20, sound is provided to the player. On the control panel assembly 16, a bill/ticket identification device 26, a printer device 28, and an operation unit 30 are provided.

The player tracking unit 18 may be housed on the center of the front surface of the control panel assembly 16. The player tracking unit 18 has a card reader that recognizes a player identification card, a display that presents data to the player, and a keypad that receives input by the player.

The bill/ticket identification device 26 is disposed on the control panel assembly 16 in a state where the insertion opening that a bill/ticket is inserted into is exposed, an identification part that identifies a bill/ticket by various sensors on the inside of the insertion opening is provided, and a bill/ticket storage part is provided on the outgoing side of the identification part. The bill/ticket identification device 26, receives and identifies bills/tickets (including vouchers and coupons) that are the game value as a game executing value, and notifies the game control unit assembly 20.

The printer device 28 is disposed on the control panel assembly 16 in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer device 28, under the control of the game control unit assembly 20 mentioned below, prints information on paper and outputs a ticket according to credit payout processing from the gaming machine 10. The output ticket can use the payout credit as game play by being inserted into the bill/ticket identification device 26 of another gaming machine, or, can be exchanged for cash by a kiosk terminal inside of the casino or a casino cage.

The operation unit 30 receives the operation of the player. The operation unit 30 includes a group of buttons that receives various instructions from the player on the gaming machine 10. The operation unit 30, for example, may include a start button and a group of setting buttons. The start button receives an instruction to start an instance of the game. The group of buttons includes a group of bet buttons, a denomination button, a max bet button, and a payout button and the like. The group of bet buttons receives an instruction operation regarding the bet amount of credits (bet number) from the player. The max bet button receives an instruction operation regarding the bet of the maximum amount of credits that can be bet at one time from the player. The payout button receives an instruction operation instructing a credit payout accumulated in the gaming machine 10. In one embodiment, the operation unit 30 may include a touchscreen panel display that displays the graphic computer images of the group of buttons and performs functions similar to the group of buttons including transmitting player selections to the game control unit assembly 20. The gaming machine 10 also includes illumination devices 31 that provides decorative lighting to the gaming machine 10.

The game control unit assembly 20 includes a control board equipped with a central processing unit (CPU) including a processor, an interface unit, a memory device including a memory and a storage, and the like. The control board is configured so that communication is possible through the interface unit and each of the gaming machine components to control the operation of each part by executing the program recorded in the memory and/or the storage, and provide a game to the player. The function of the CPU is to execute and display the game on the display unit assembly of the gaming machine 10.

The interface unit includes a chip set providing communication functions of the CPU, a memory bus connected to a CPU, various expanding buses, serial interfaces, USB interfaces, Ethernet™ interfaces and the like, and a computer unit where the CPU provides the addressable memory and the storage through the interface unit. The memory can be configured to include RAM that is a volatile storage medium, ROM that is a nonvolatile storage medium, and EEPROM that is a rewritable nonvolatile storage medium. The storage provides the game control unit as an external storage device function, can use reading devices such as a memory card that is a removable storage medium, and a magneto optical disk and the like, and can use hard disks.

On the interface unit, in addition to the CPU, the memory, and the storage, a bill/ticket identification unit controller, a printer unit controller, the player tracking unit, a graphic controller, an input controller, and a sound controller are connected. That is, the CPU is connected to the operation unit 30 through the input controller, and connected to the display unit assembly through the graphic controller. Further, when illumination devices that provides decorative lighting to the gaming machine 10 are provided, the illumination is controlled under the control of the CPU on the interface unit, and an illumination controller that controls the illumination devices to provide a decorative lighting effect may be connected.

The bill/ticket identification unit controller operates the bill/ticket identification device to receive bills/tickets in the insertion opening, and notifies the CPU of identifying information corresponding to the assortment of bills or the payout processing of credits. The bill/ticket identification unit controller notifies the information to the CPU, and the CPU increases the usable credit amount inside of the game according to the notified content. The printer unit controller corresponds to the printer device, and under the control of the CPU that receives an operation of the payout button of the group of setting buttons, information corresponding to the credit payout processing from the gaming machine 10 is printed and output on a printed ticket.

The player ranking (or tracking unit) unit cooperatively operates with the CPU, and sends and receives information and the like of the player from the casino management system. The graphic controller controls the display unit assembly 14, under the control of the CPU, and displays a display image that includes various graphic data. The sound controller drives the speakers under the control of the CPU, and provides various sounds such as an announcement, sound effects, BGM and the like.

Further, the interface unit, has various communication interfaces for communicating with the exterior of the gaming machine 10, for example the interface unit can communicate with an external network by Ethernet, and a serial interface. In the present embodiment, one example shows when there is communication between a well-known server-side gaming network (Server Based Gaming), a G2S network (Game to System), and a slot information system (Slot Data System), respectively.

In the illustrated embodiment, the modular cabinet system 12 includes a cabinet stand assembly 32 and a housing assembly 34. The housing assembly 34 is mounted onto a top portion of the cabinet stand assembly 32. The cabinet stand assembly 32 is configured to support the housing assembly 34 from a ground surface.

The housing assembly 34 includes a control unit housing 36 and a display unit support assembly 38. The housing assembly 34 also includes a plurality of panel support openings 40 (shown in FIGS. 5 and 15) that are defined along an outer surface of the housing assembly 34 for mounting one or more side panel assemblies to the housing assembly 34.

The control unit housing 36 is mounted onto the top portion of the cabinet stand assembly 32 and includes a base unit 42 and a cover unit 44. The base unit 42 includes an outer surface and an inner surface. The inner surface defines an interior cavity 46 that is sized and shaped to receive the game control unit assembly 20 therein. The cover unit 44 is removably coupled to the base unit 42 and is configured to enclose the game control unit assembly 20 within the interior cavity 46.

The housing assembly 34 includes a plurality of sliding bracket assemblies 48 that are coupled to the base unit 42 and to the cover unit 44. The sliding bracket assemblies 48 are configured to allow the cover unit 44 to move with respect to the base unit 42 along a longitudinal axis 50 to selectively allow access to the interior cavity 46.

The cover unit 44 includes a body that extends between a front portion 52 and an opposite rear portion 54. The rear portion 54 includes a rear mounting surface 55 that is configured to contact the base unit 42. The front portion 52 includes an outer surface and an opening 56 extending through the outer surface to provide access to the interior cavity 46. An access panel 58 is pivotably coupled to the front portion 52 with a pair of hinge assemblies 60. The access panel 58 is positionable between an open position providing access to the interior cavity 46 and a closed position restricting access to the interior cavity 46.

The cover unit 44 also includes a control panel support member 62 that extends outwardly from the front portion 52. The control panel support member 62 is configured to support the control panel assembly 16 from the cover unit 44.

The display unit support assembly 38 is mounted to a top portion of the base unit 42. The display unit support assembly 38 includes a plurality of modular display support members 70 that are configured to support the display unit assembly 14 from the housing assembly 34. Each modular display support member 70 includes an outer surface and an inner surface defining an interior equipment cavity 72.

The display unit support assembly 38 also includes one or more bracket assemblies 74 for mounting the display unit assembly 14 to the modular display support members 70. The bracket assembly 74 includes a display unit support bracket 76 that is mounted to the display unit assembly 14 and a pair of display unit sliding bracket assemblies 78 that are coupled to the display unit support bracket 76. The display unit sliding bracket assemblies 78 are coupled to a corresponding modular display support member 70 and are configured to allow the display unit support bracket 76 to move with respect to the corresponding modular display support member 70 along the longitudinal axis 50 to allow an operator to access a rear portion of the display unit assembly 14 and/or the interior equipment cavity 72. The display unit assembly 14 may be coupled to one or more bracket assemblies 74 to support the display unit assembly 14 from the housing assembly 34 and to allow the display unit assembly 14 to move with respect to the housing assembly 34 along the longitudinal axis 50.

The plurality of modular display support members 70 includes a primary display support member 80 and one or more secondary display support members 82. The primary display support member 80 includes an outer surface extending between a top end and a bottom end. The outer surface includes a front surface 84 extending between the top end and the bottom end. The front surface 84 includes a top portion 86 and a bottom portion 88. The top portion 86 extends from the top end and is orientated along a vertical axis 90. The bottom portion 88 extends at an oblique angle from the top portion 86 to the bottom end. The primary display support member 80 also includes an opening that extends through the front surface 84 to provide access to the interior equipment cavity 72.

The secondary display support member 82 includes a front outer surface that is orientated along the vertical axis 90, and an equipment access opening 92 that extends through the front outer surface to allow access to the interior equipment cavity 72. The secondary display support member 82 may also include a removable cover 94 that is removably coupled to the front outer surface and extends across the equipment access opening 92 to restrict access to the interior equipment cavity 72.

The secondary display support member 82 includes a substantially rectangular cross-sectional shape having a height 96 measured along the vertical axis 90, a thickness 98 measured along the longitudinal axis 50, and a width 100 measured along a transvers axis 102 that is perpendicular to the vertical axis 90 and the longitudinal axis 50.

The primary display support member 80 includes a width 104 measured along the transvers axis 102 that is substantially equal to the width 100 of the secondary display support member 82. In the illustrated embodiment, the top portion 86 of the primary display support member 80 includes a thickness 106 measured along the longitudinal axis 50 that is substantially equal to the thickness 98 of the secondary display support member 82 and the bottom portion 88 of the primary display support member 80 includes a thickness 108 measured along the longitudinal axis 50 that is greater than the thickness 106 of the top portion 86. In other embodiments, the bottom portion 88 of the primary display support member 80 is substantially planar with the top portion 86 such that the bottom portion 88 and top portion 86 have the same thickness 106 which is substantially equal to the thickness 98 of the secondary display support member 82. The primary display support member 80 also includes a height 110 measured along the vertical axis 90 that is greater than the height 96 of the secondary display support member 82.

In some embodiments, the modular cabinet system 12 may include a slot topper assembly 112 that is mounted to the top portion of the display unit support assembly 38.

The plurality of modular display support members 70 allow the modular cabinet system 12 to support one or more display units 22 of the same, or varying sizes, to provide various configurations for gaming machines 10 to accommodate various game themes and game play. For example, in the illustrated embodiments, the modular cabinet system 12 may be configured in a plurality of configurations including, but not limited to: a first configuration 114 such as, for example, the Dimension 49J™ gaming cabinet available from Konami™ (shown in FIGS. 5, 6, 8, and 19-24) including a larger primary display unit 116 and a smaller secondary display unit 118; a second configuration 120 such as, for example, the Dimension 27™ gaming cabinet available from Konami™ (shown in FIGS. 9 and 25-26) that includes three display units 22 of similar size and shape; a third configuration 122 (shown in FIGS. 27-29) that includes two display units 22 of similar size and shape; and a fourth configuration 124 (shown in FIGS. 30-31) that includes a single larger display unit 116. The modular cabinet system 12 may allow for other configurations and one skilled in the art would understand that the configurations available using the modular cabinet system 12 are not limited to the configuration illustrated herein and combinations of any of the above features are also included within the scope of the modular cabinet system 12.

Referring again to FIGS. 5-18, in the illustrated embodiment, the gaming machine 10 includes the modular cabinet system 12 supporting the display unit assembly 14, the game control unit assembly 20, and the control panel assembly 16. The gaming machine 10 may also include a gaming chair 126 that includes a seat 128, a backrest 130, and a video display screen 132 mounted on a rear portion of the backrest 130. The game control unit assembly 20 is coupled to the video display screen 132 to operate the video display screen 132 to display computer generated images and/or lighting effects in synchronization with images being shown on the display unit assembly 14 and/or lighting effects displayed by the illumination devices 31.

The modular cabinet system 12 includes the cabinet stand assembly 32 supported on a ground surface, the control unit housing 36 mounted on the cabinet stand assembly 32, and the display unit support assembly 38 mounted on the control unit housing 36. The control unit housing 36 is configured to support the control panel assembly 16 and includes the interior cavity 46 enclosing the game control unit assembly 20. The control unit housing 36 includes the base unit 42 and the cover unit 44 removably coupled to the base unit 42. The base unit 42 includes the interior cavity 46 enclosing the game control unit assembly 20. The control unit housing 36 also includes a plurality of sliding bracket assemblies 48 that are coupled to the inner surface of the base unit 42 and to the cover unit 44 to allow the cover unit 44 to move with respect to the base unit 42 between an open position (shown in FIG. 12) to allow access to the game control unit assembly 20 housed within the interior cavity 46 and a closed position (shown in FIG. 2) with the cover unit 44 in contact with the base unit 42.

The cover unit 44 extends between the front portion 52 and the opposite rear portion 54 with the rear portion 54 including the rear mounting surface 55 that is configured to contact the base unit 42 with the cover unit 44 in the closed position. The front portion 52 includes the access opening 56 extending through the outer surface of the front portion 52 to provide access to the interior cavity 46. The cover unit 44 also includes the access panel 58 that is pivotably coupled to the front portion 52 with the hinge assemblies 60. The access panel 58 is positionable between an open position (shown in FIG. 12) providing access to the interior cavity 46 and a closed position (shown in FIG. 2) covering the access opening 56 and restricting access to the interior cavity 46. The cover unit 44 also includes the control panel support member 62 extending outwardly from the front portion 52. The control panel assembly 16 is coupled to the control panel support member 62 such that the control panel support member 62 supports the control panel assembly 16 from the cover unit 44.

The display unit support assembly 38 includes a primary display support member 80 mounted on the control unit housing 36 and a primary bracket assembly 134 slidably coupled to the primary display support member 80. The primary display support member 80 includes the interior equipment cavity 72 that is configured to receive the primary bracket assembly 134 therein. The primary bracket assembly 134 includes a plurality of primary display unit sliding bracket assemblies 136 and a primary display unit support bracket 138. The primary display unit sliding bracket assemblies 136 are coupled to the inner surface of the primary display support member 80. The primary display unit support bracket 138 is coupled to the plurality of primary display unit sliding bracket assemblies 136 to allow the primary display unit support bracket 138 to move with respect to the primary display support member 80 along the longitudinal axis 50. The primary display unit support bracket 138 is coupled to the primary display unit 116 to support the primary display unit 116 from the primary display support member 80 and to allow the primary display unit 116 to move with respect to the primary display support member 80. For example, the primary bracket assembly 134 allows the primary display unit 116 to be positioned between a first open position (shown in FIG. 14) in which the primary display unit 116 is spaced a distance from the primary display support member 80 to allow access to the interior equipment cavity 72 of the primary display support member 80 and a second closed position (shown in FIG. 2) in which the primary display unit support bracket 138 is positioned within the interior equipment cavity 72 and a rear surface of the primary display unit 116 is positioned adjacent to the primary display support member 80.

Figure 10:
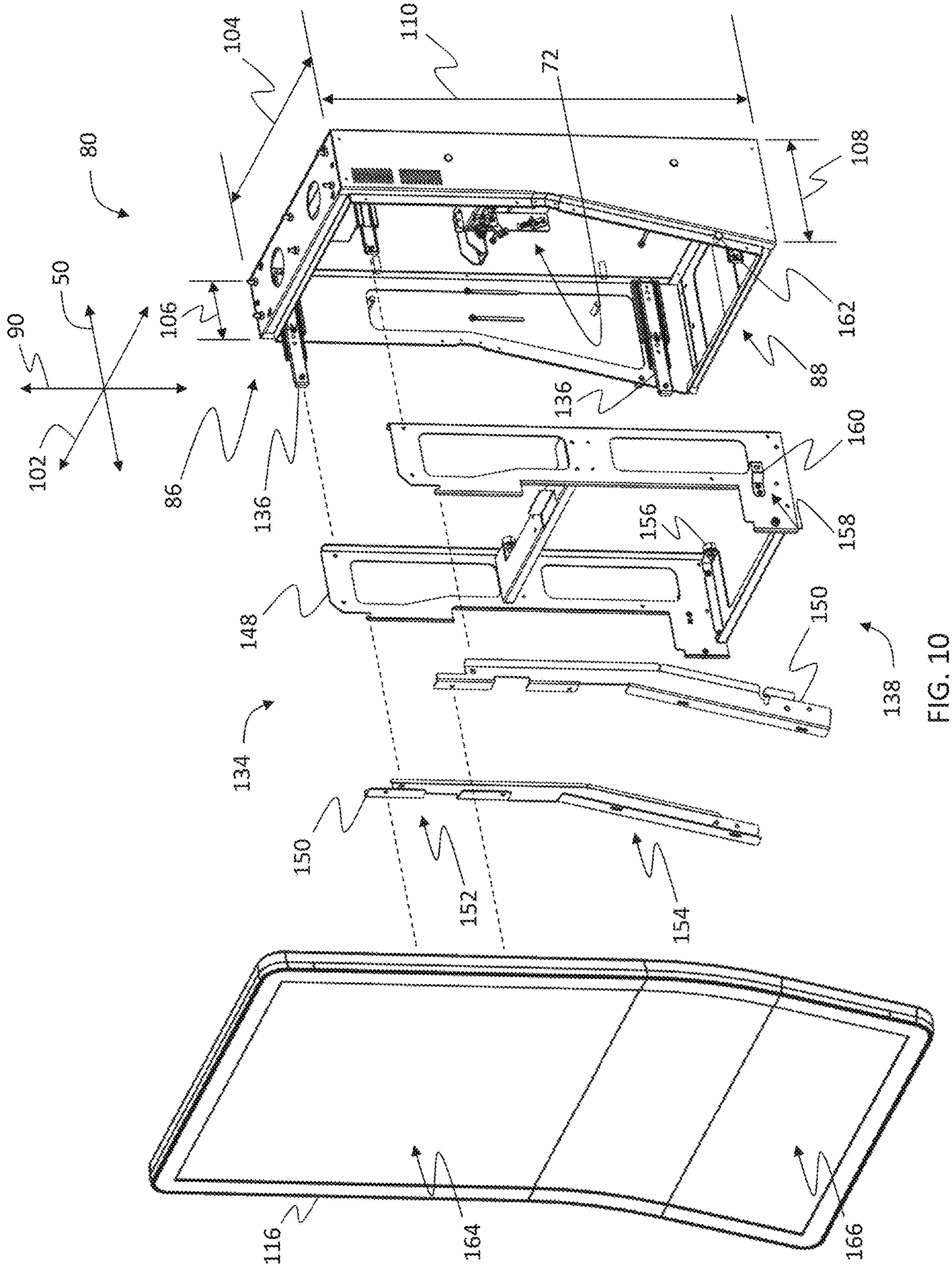
FIG. 10 is an exploded perspective view of a primary display support member and primary bracket assembly that may be used with the display unit support assembly.
Figure 11:
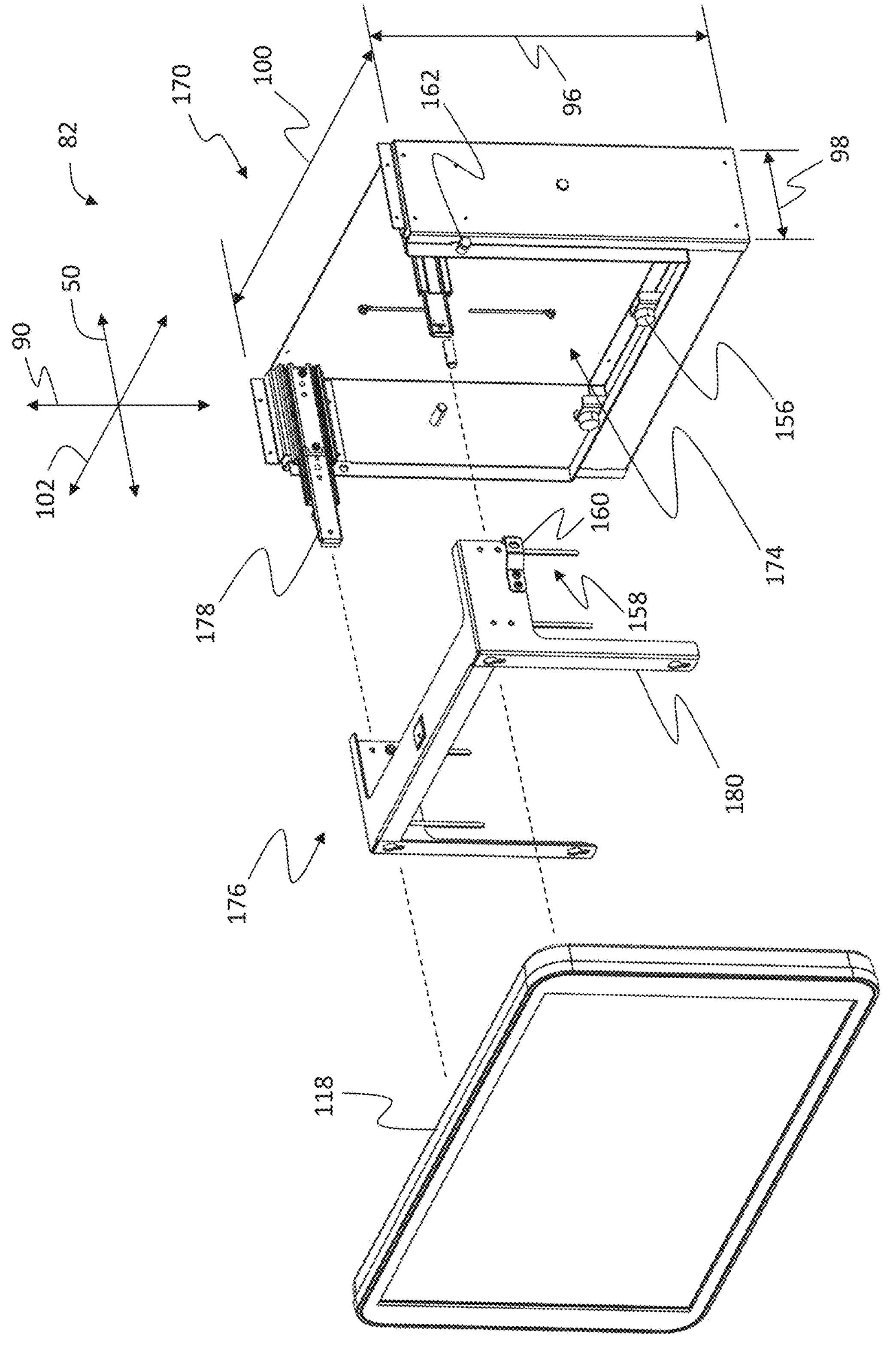
FIG. 11 is an exploded perspective view of a secondary display support member and a secondary bracket assembly that may be used with the display unit support assembly.
Figure 12:
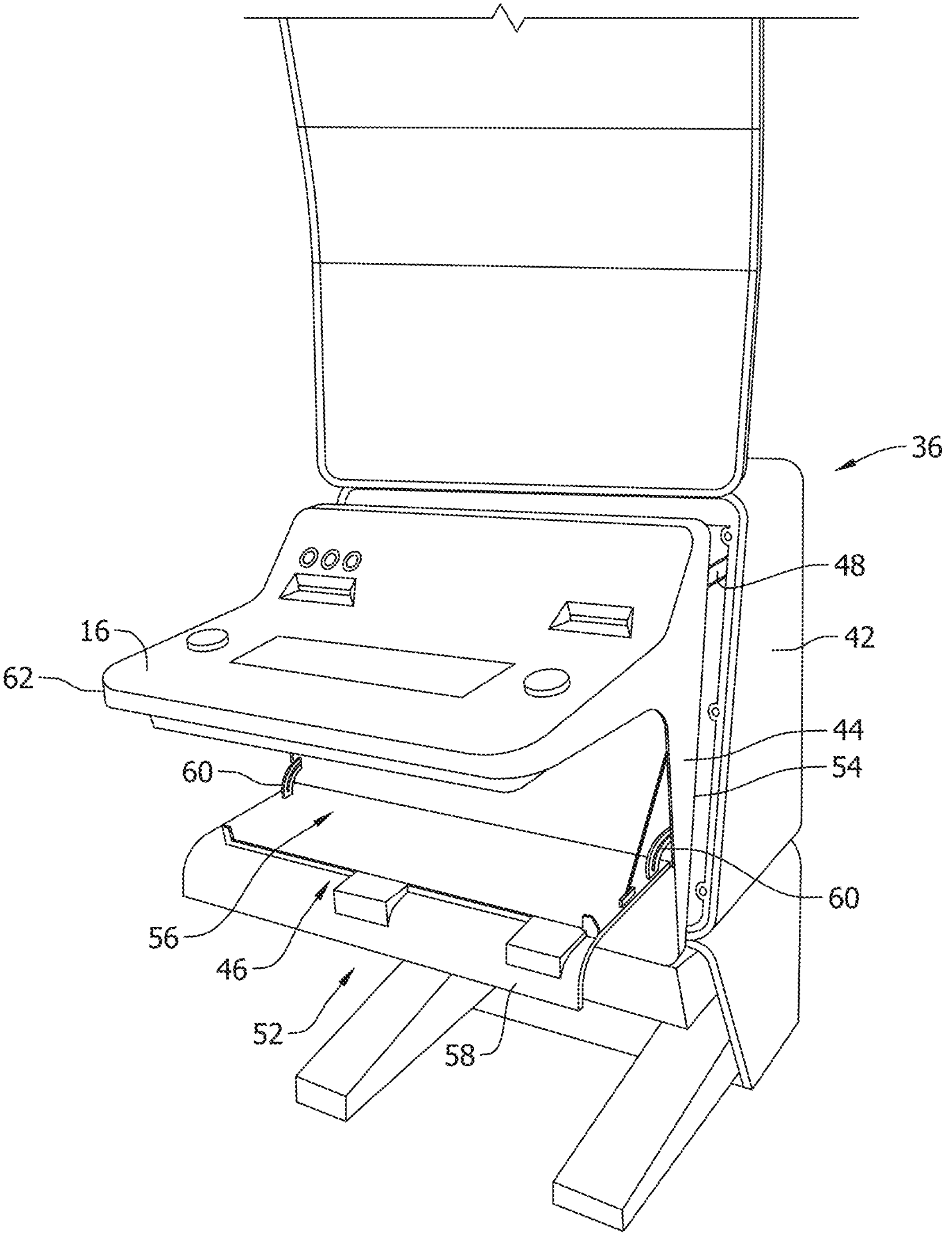
FIGS. 12-15 are perspective views of portions of the control unit housing.
Figure 13:
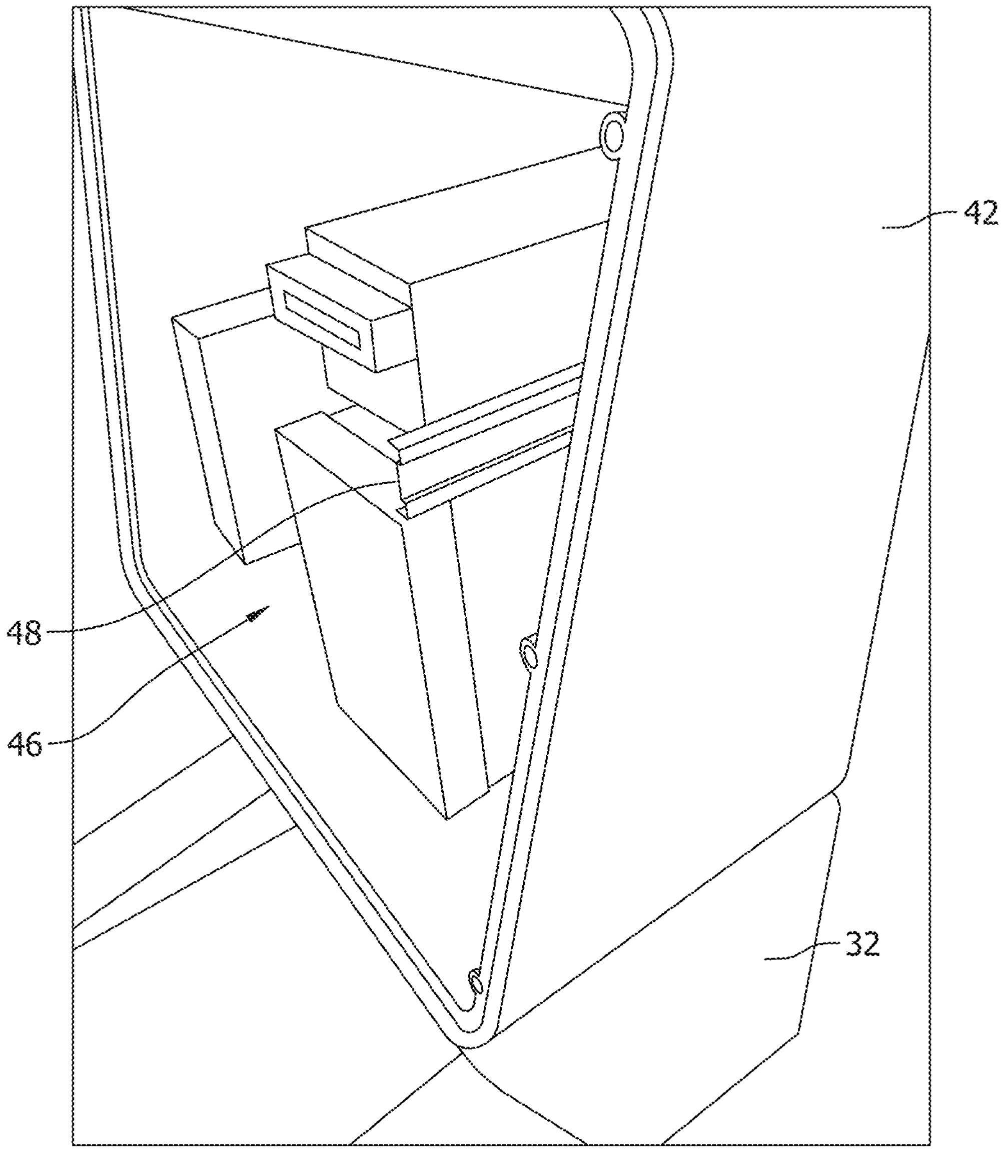
Figure 14:
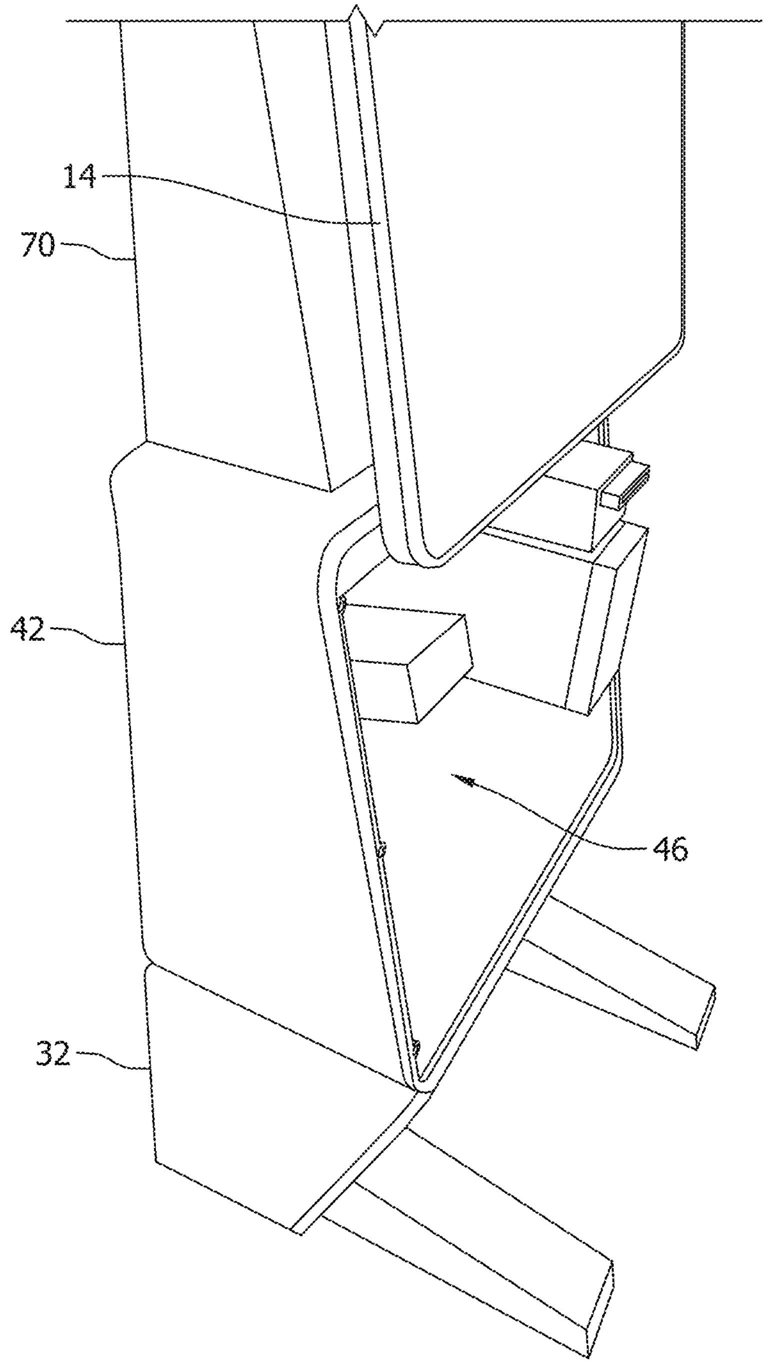
Figure 15:
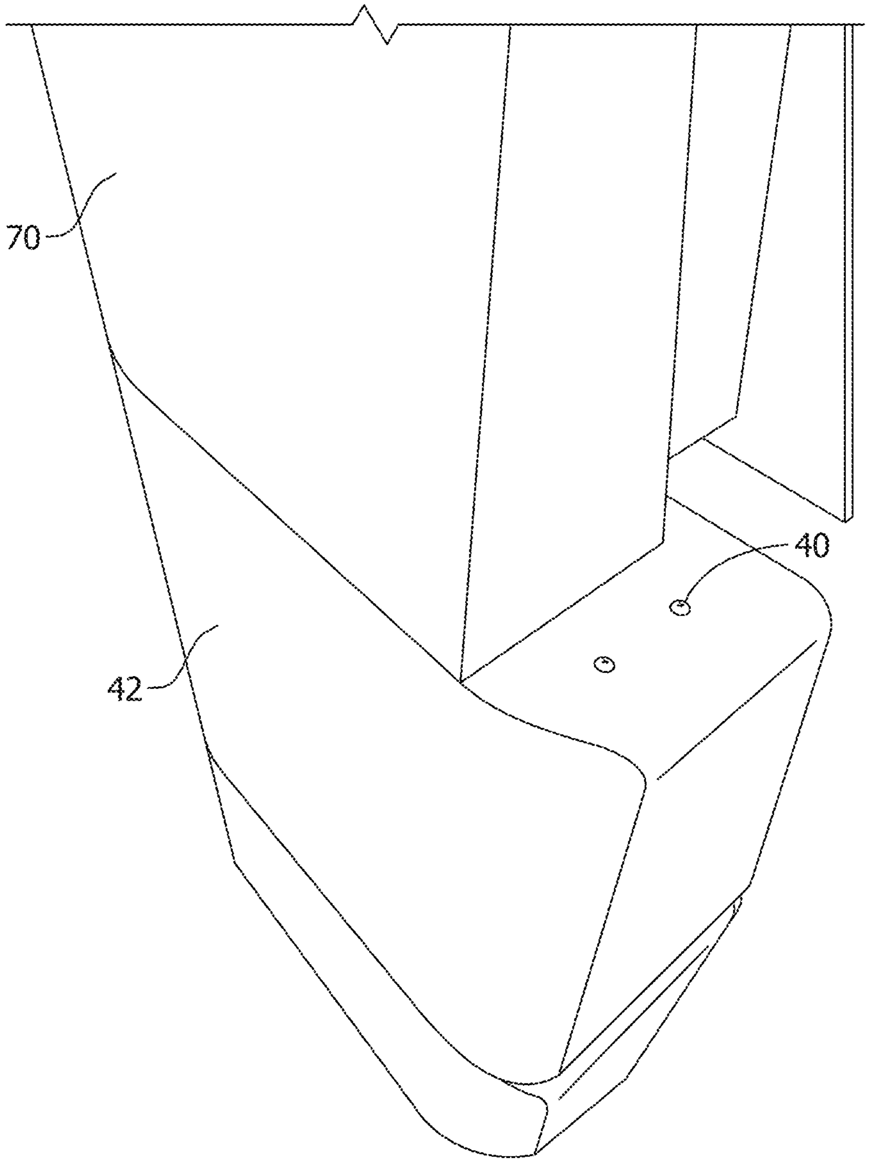
Figure 16:
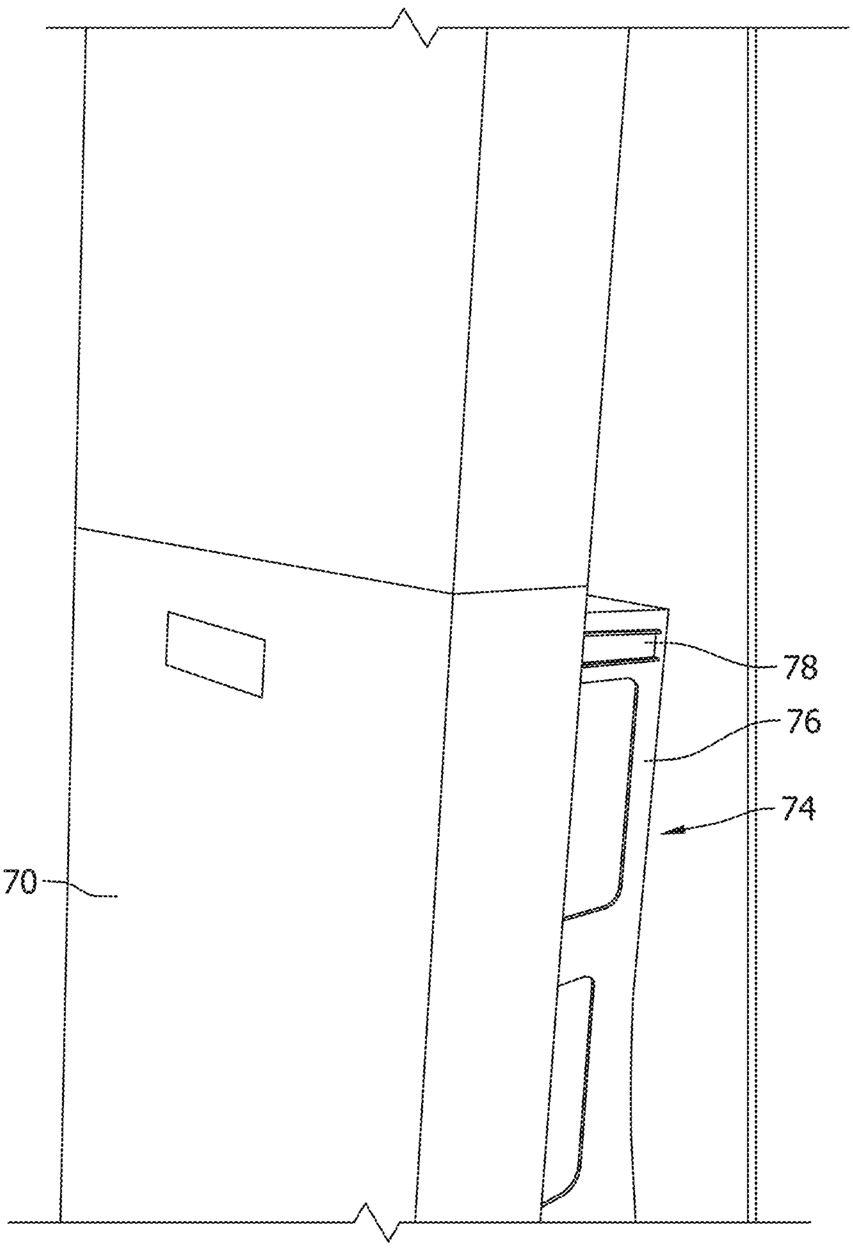
FIGS. 16-18 are perspective views of portions of the display unit support assembly.
Figure 17:
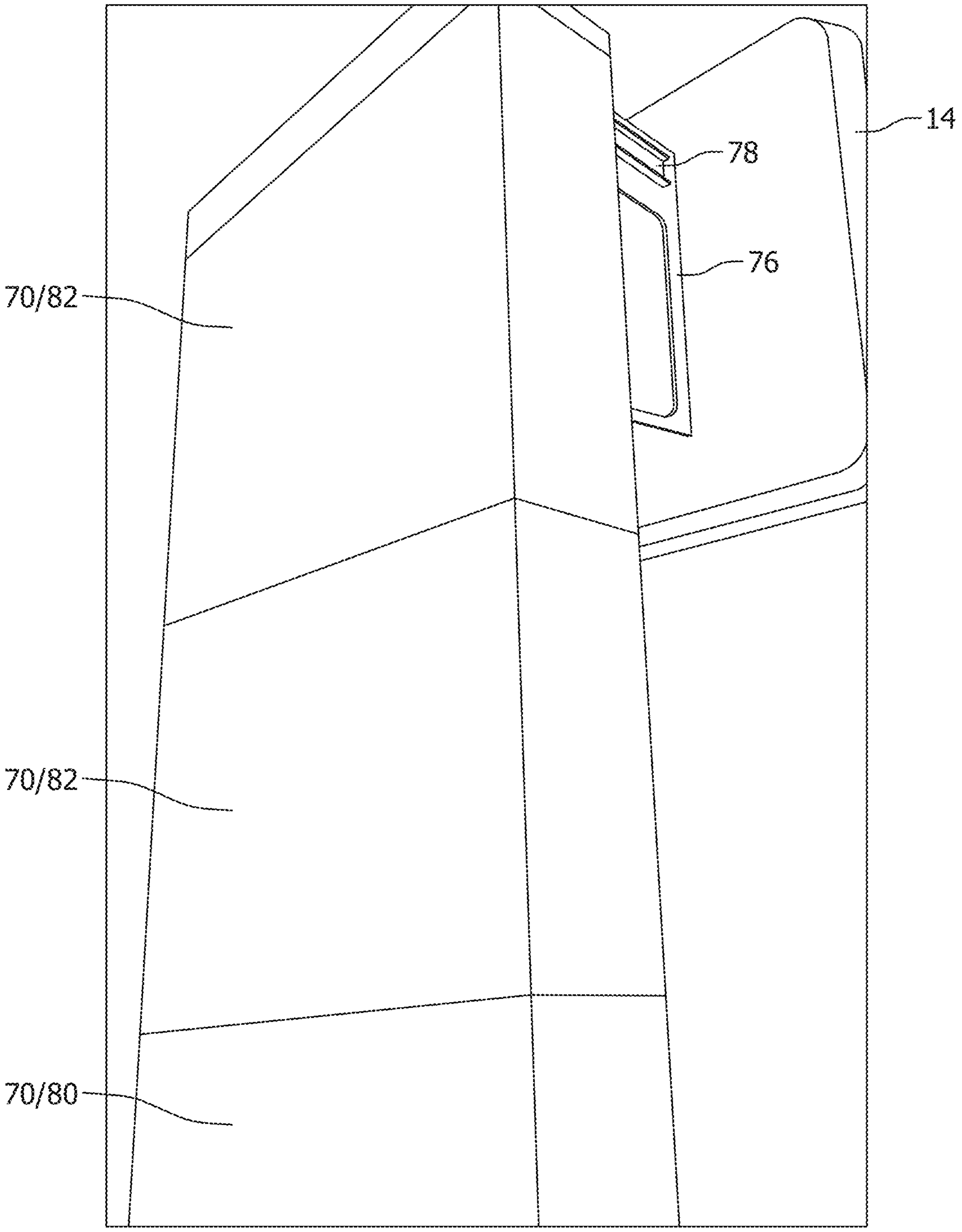
Figure 18:
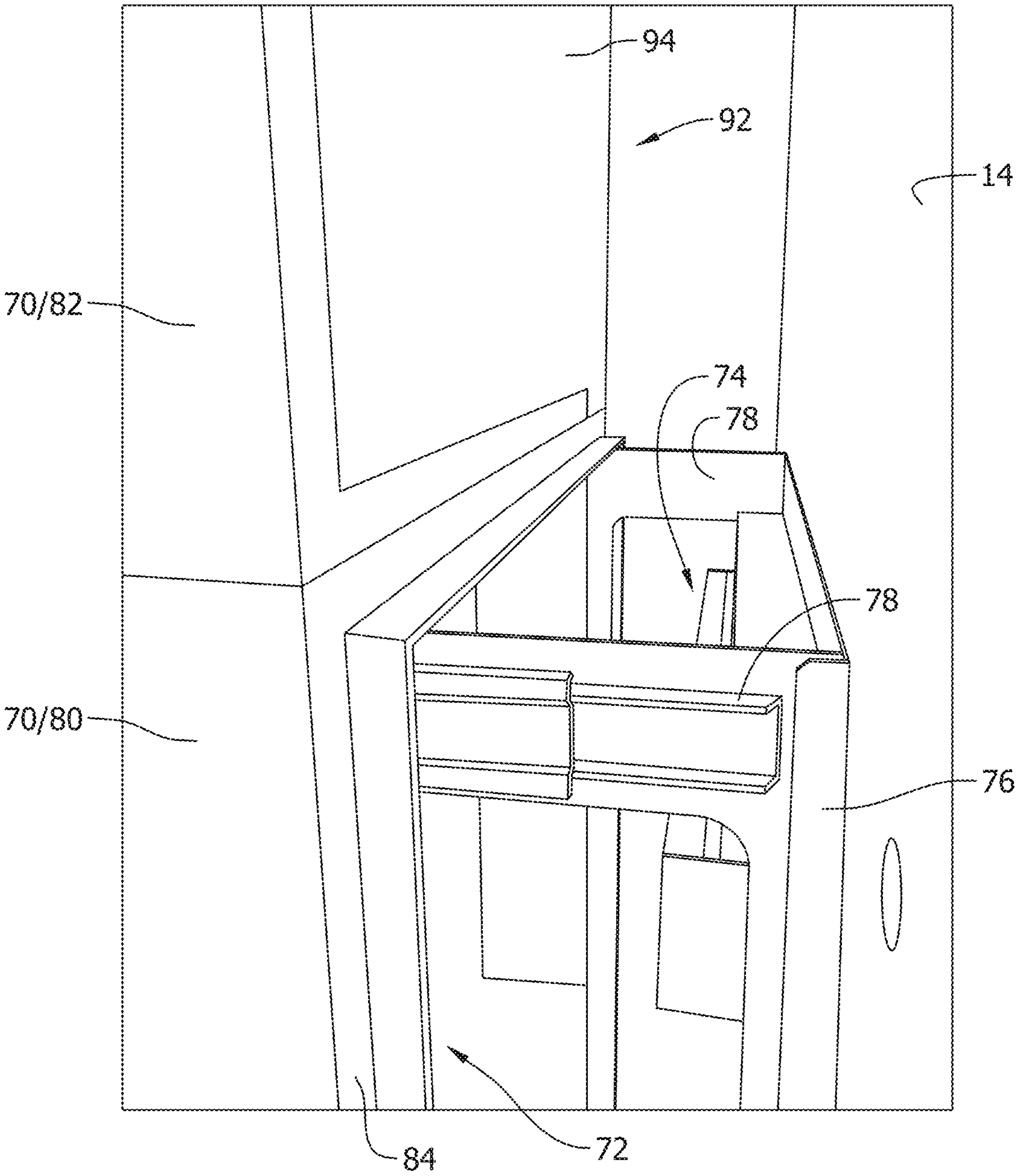
Figure 19:
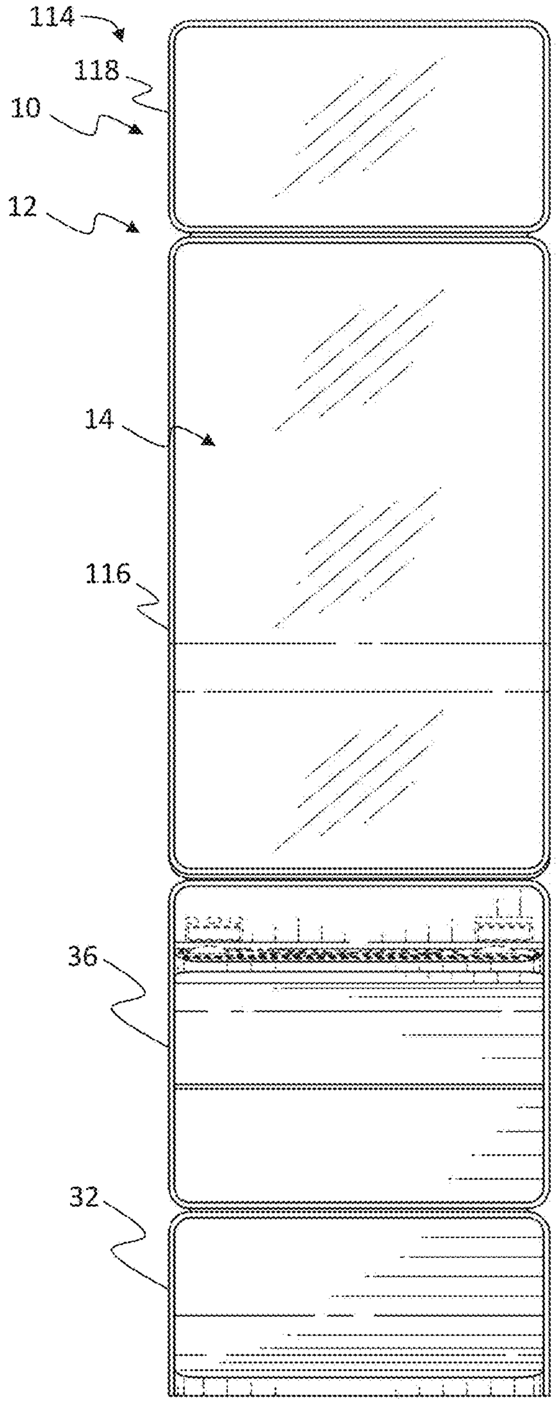
FIG. 19 is a front view of the modular gaming cabinet system in the first configuration.
Figure 20:
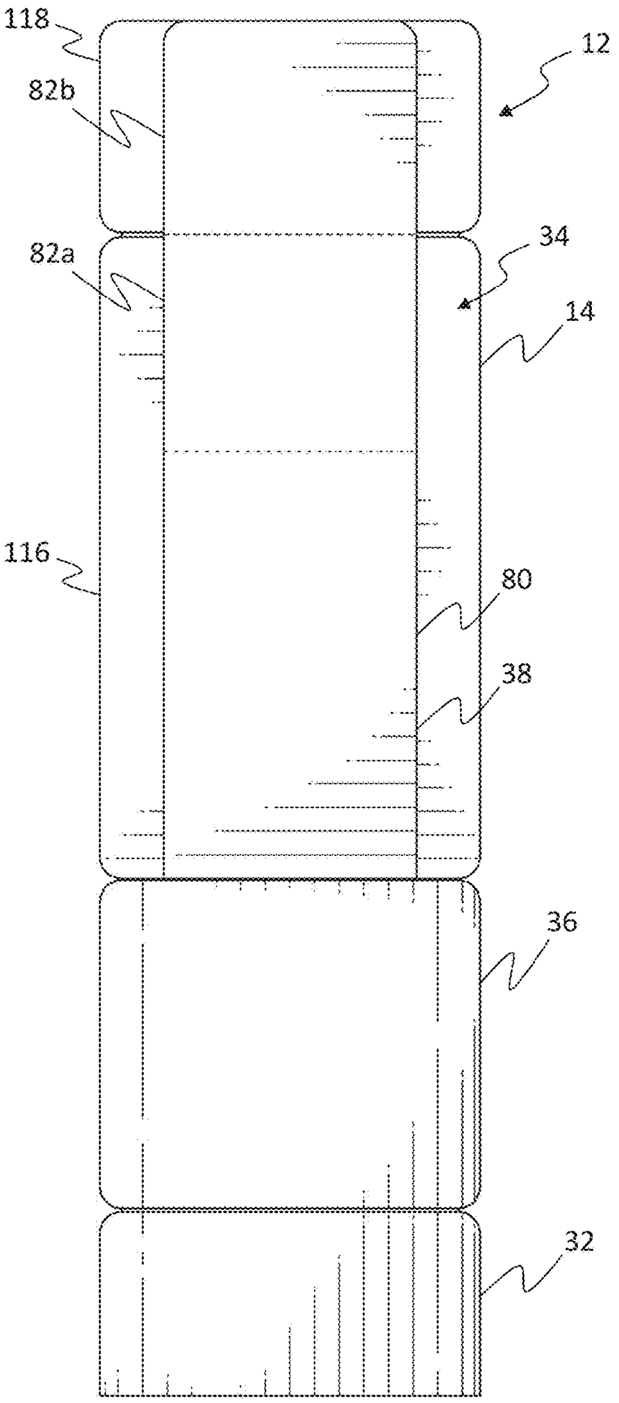
FIG. 20 is a rear view of the modular gaming cabinet system in the first configuration.
Figure 21:
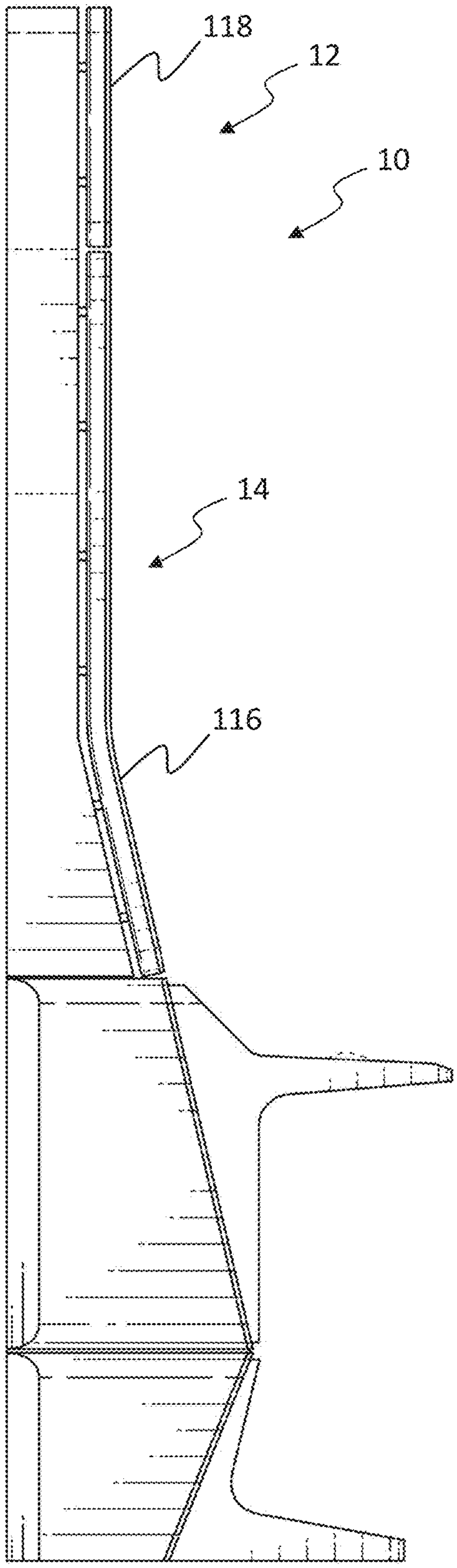
FIG. 21 is a right-side view of the modular gaming cabinet system in the first configuration.
Figure 22:
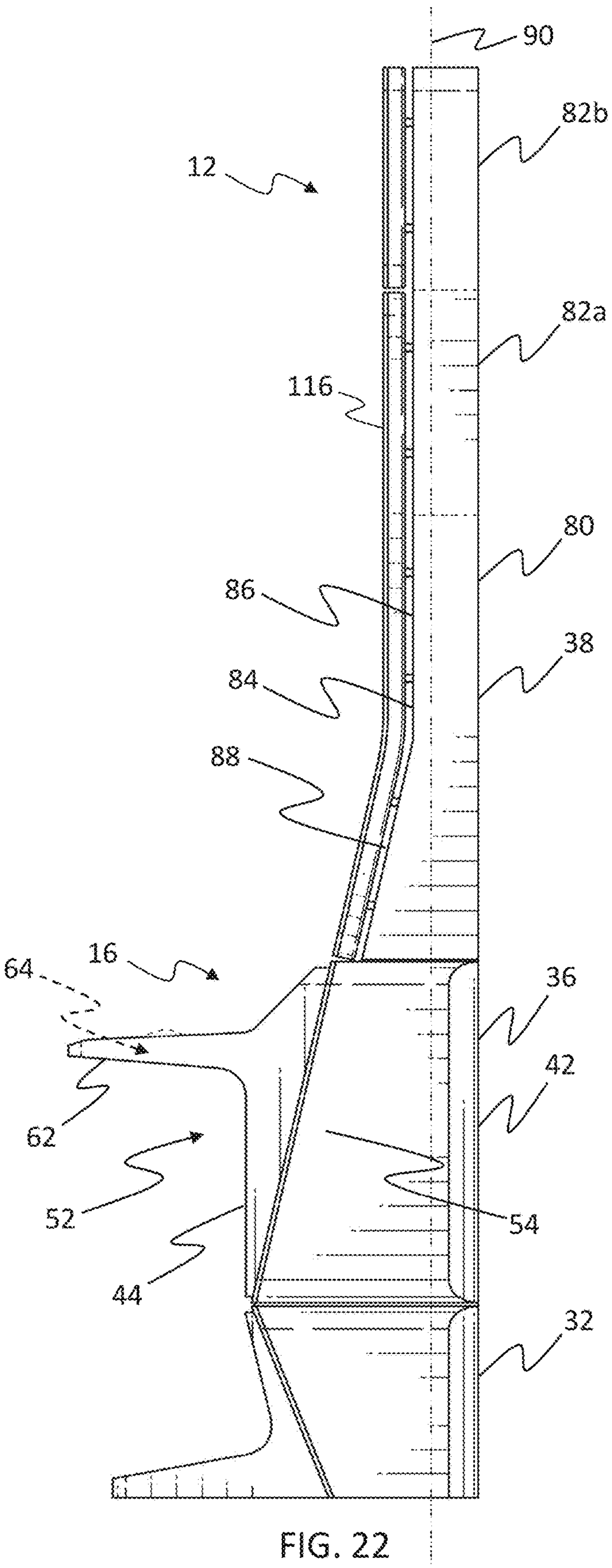
FIG. 22 is a left-side view of the modular gaming cabinet system in the first configuration.
Figure 23:
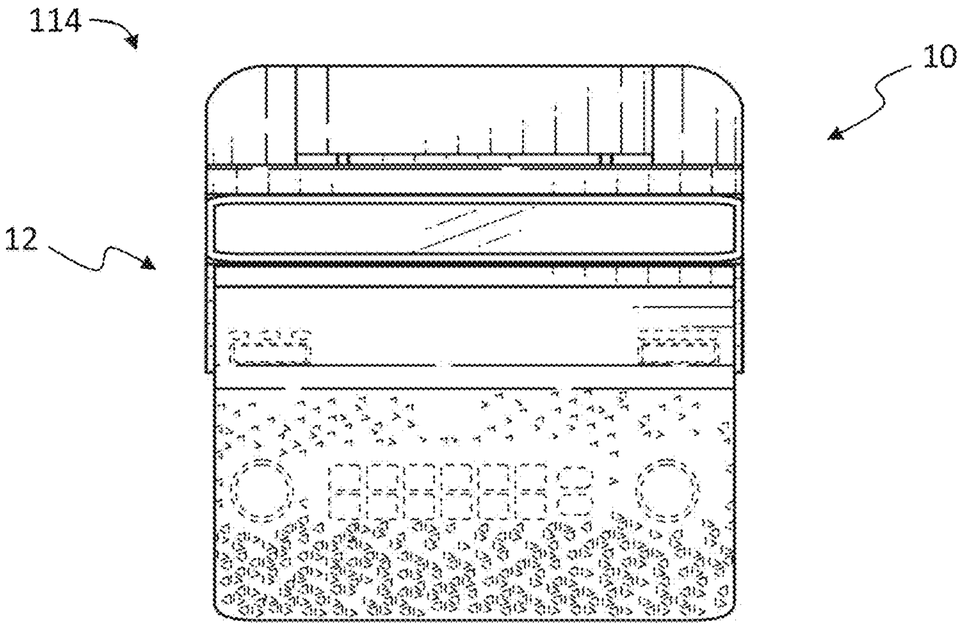
FIG. 23 is a top view of the modular gaming cabinet system in the first configuration.
Figure 24:
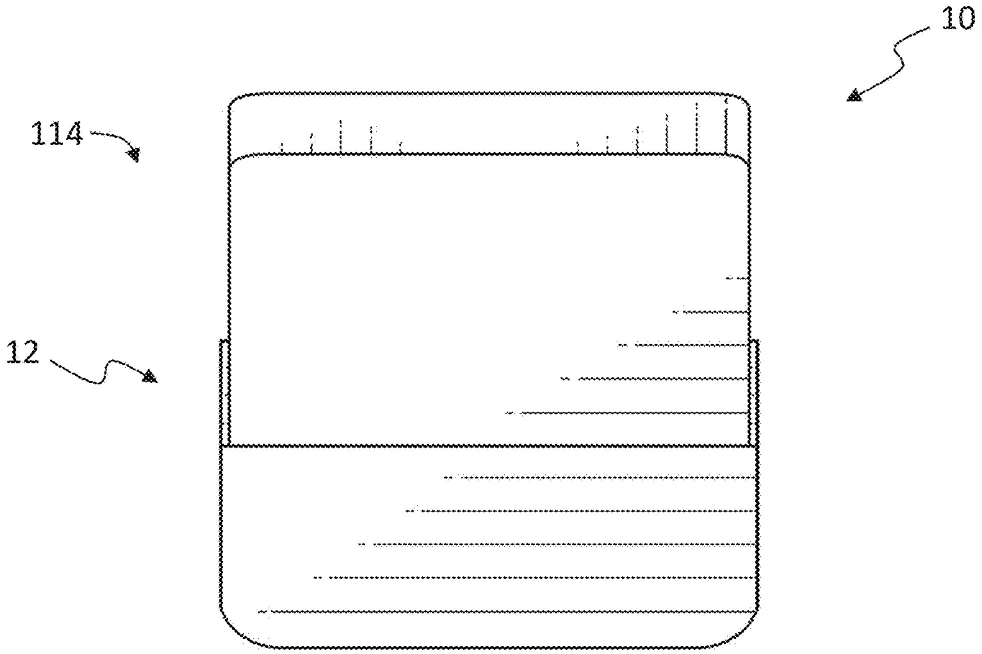
FIG. 24 is a bottom view of the modular gaming cabinet system in the first configuration.
Figure 26:
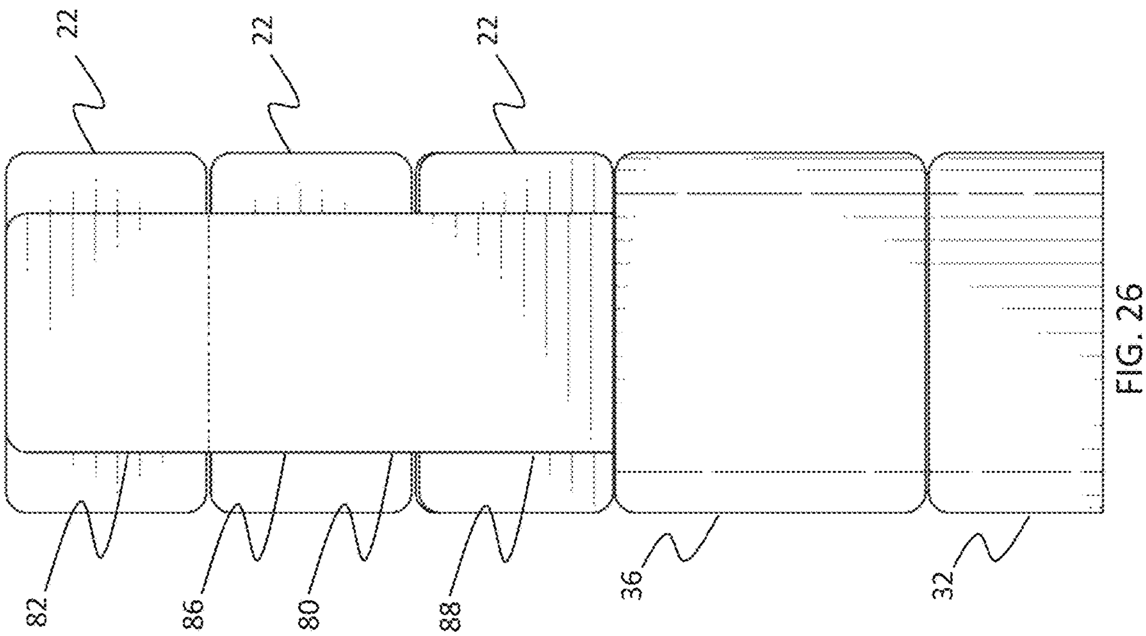
FIG. 26 is a rear view of the modular gaming cabinet system in the second configuration.
Figure 25:
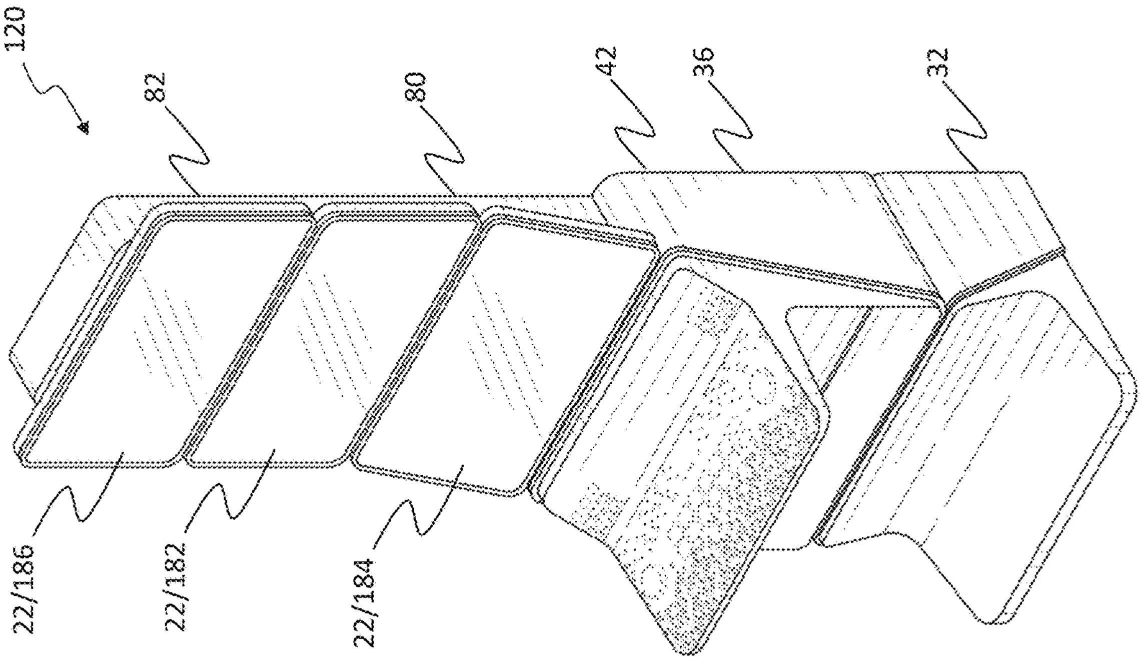
FIG. 25 is a perspective view of the modular gaming cabinet system in the second configuration.

In some embodiments, the primary display unit support bracket 138 extends between a top end 140 and a bottom end 142 and includes a top portion 144 extending from the top end 140 and orientated along the vertical axis 90 and a bottom portion 146 extending at an oblique angle from the top portion 144 to the bottom end 142. Referring to FIG. 10, in one embodiment, the primary display unit support bracket 138 includes a support frame 148 that is coupled to the primary display unit sliding bracket assemblies 136 and a pair of support bracket arms 150 that are coupled to the support frame 148. The pair of support bracket arms 150 are adapted to be coupled to one or more primary display units 22 to support the primary display units 22 from the primary display support member 80. In the illustrated embodiment, each support bracket arm 150 includes a top portion 152 oriented along the vertical axis 90 and a bottom portion 154 that extends from the top portion 152 at an oblique angle. In other embodiments, the bottom portion 154 may be orientated substantially planar with the top portion 152.

The primary bracket assembly 134 may also include one or more bumper assemblies 156 that are coupled to a rear portion of the support frame 148 and configured to contact a rear interior surface of the primary display support member 80 when the primary bracket assembly 134 is moved into the interior equipment cavity 72 of the primary display support member 80. The primary bracket assembly 134 may also include one or more positioning assemblies 158 configured to facilitate maintaining the primary bracket assembly 134 in the closed position. The positioning assembly 158 may include a positioning clip 160 coupled to the support frame 148 and a positioning pin 162. With the primary bracket assembly 134 in the closed position, the positioning pin 162 is inserted through an opening in the primary display support member 80 and into a corresponding opening defined in the positioning clip 160 to lock the primary bracket assembly 134 in the closed position.

Referring to FIGS. 6-11 and 19-24, in the first configuration 114, the modular cabinet system 12 is configured to support a display unit assembly 14 that includes a larger primary display unit 116 and a smaller secondary display unit 118 that has smaller screen dimensions than the primary display unit 116, with each of the larger primary display unit 116 and the smaller secondary display unit 118 having the same width measured along the transverse axis 102. The larger primary display unit 116 includes an upper portion 164 and a lower portion 166 extending at an oblique angle from the upper portion 164. The bottom portion 146 of the primary display unit support bracket 138 is orientated at a substantially similar oblique angle such that the lower portion 166 of the larger primary display unit 116 is positioned adjacent to the bottom portion 146 of the primary display unit support bracket 138 with the larger primary display unit 116 coupled to the primary display unit support bracket 138. The upper portion 164 of the larger primary display unit 116 extends a vertical distance 168 above the top portion 144 of the primary display unit support bracket 138 with the larger primary display unit 116 coupled to the primary display unit support bracket 138.

In the first configuration 114, the display unit assembly 14 includes the secondary display unit 118 positioned above the primary display unit 116. The display unit support assembly 38 includes a plurality of secondary display support members 82 that are mounted on the primary display support member 80 in a stacked arrangement. The plurality of secondary display support members 82 includes a first secondary display support member 170 that is coupled to the secondary display unit 118 and a second secondary display support member 172 that is orientated between the first secondary display support member 170 and the primary display support member 80. The second secondary display support member 172 includes the removable cover 94 extending across the equipment access opening 92.

The first secondary display support member 170 includes an inner surface that defines a secondary interior equipment cavity 174 with a secondary bracket assembly 176 slidably coupled to the first secondary display support member 170 and positionable within the secondary interior equipment cavity 174. The secondary display unit 118 is coupled to the secondary bracket assembly 176 to allow the secondary display unit 118 to move with respect to the first secondary display support member 170.

The secondary bracket assembly 176 includes a plurality of secondary display sliding bracket assemblies 178 and a secondary display support bracket 180. The secondary display sliding bracket assemblies 178 are coupled to the inner surface of the first secondary display support member 170. The secondary display support bracket 180 is coupled to the plurality of secondary display sliding bracket assemblies 178 to allow the secondary display support bracket 180 to move with respect to the first secondary display support member 170 along the longitudinal axis 50. The secondary display support bracket 180 is coupled to the secondary display unit 118 to support the secondary display unit 118 from the first secondary display support member 170 and to allow the secondary display unit 118 to move with respect to the first secondary display support member 170. For example, the secondary bracket assembly 176 allows the secondary display unit 118 to be positioned between a first open position (shown in FIG. 17) in which the secondary display unit 118 is spaced a distance from the first secondary display support member 170 to allow access to the secondary interior equipment cavity 174 and a second closed position (shown in FIG. 2) in which the secondary display support bracket 180 is positioned within the secondary interior equipment cavity 174 and a rear surface of the secondary display unit 118 is positioned adjacent to the first secondary display support member 170.

The secondary bracket assembly 176 may also include one or more bumper assemblies 156 that are coupled to a front portion of the first secondary display support member 170 and configured to contact a rear interior surface of the secondary display unit 118 when the secondary bracket assembly 176 is moved into the secondary interior equipment cavity 174 and the secondary display unit 118 is positioned adjacent to the first secondary display support member 170. The secondary bracket assembly 176 may also include one or more positioning assemblies 158 configured to facilitate maintaining the secondary bracket assembly 176 in the closed position. The positioning assembly 158 may include a positioning clip 160 coupled to the secondary display support bracket 180 and a positioning pin 162 that is inserted through an opening in the first secondary display support member 170 and into a corresponding opening defined in the positioning clip 160 to lock the secondary bracket assembly 176 in the closed position. A slot topper assembly 112 may be mounted to the top portion of the first secondary display support member 170.

Referring to FIGS. 19-24, in some embodiments of the first configuration 114, the display unit support assembly 38 includes the primary display support member 80 mounted onto the top portion of the base unit 42, a first secondary display support member **82*a* mounted to the primary display support member 80, and a second secondary display support member 82*b* mounted to the first secondary display support member 82*a* such that the first secondary display support member 82*a* is positioned between the primary display support member 80 and the second secondary display support member 82*b*. The first bracket assembly 74 extends outwardly from the top portion 86 of the primary display support member 80 and a first display unit 116 is mounted to the first bracket assembly 74. A second bracket assembly 74 extends outwardly from the second secondary display support member 82*b* and a second display unit 118 is mounted to the second secondary display support member 82*b* with the second bracket assembly 74. The second display unit 118 is positioned adjacent to the first display unit 116 in a vertical arrangement along the vertical axis 90**.

Referring to FIGS. 9-11 and 25-26, in the second configuration 120, the modular cabinet system 12 is configured to support a display unit assembly 14 that includes three display units 22 of similar size and shape. In the second configuration 120, the display unit assembly 14 includes a first primary display unit 182 that is coupled to the top portion 144 of the primary display unit support bracket 138 and a second primary display unit 184 that is coupled to the bottom portion 146 of the primary display unit support bracket 138 such that the second primary display unit 184 is orientated at an oblique angle from the first primary display unit 182. The display unit assembly 14 also includes a secondary display unit 186 positioned above the first primary display unit 182. The display unit support assembly 38 includes a secondary display support member 82 that is mounted on the primary display support member 80 in a stacked arrangement and a secondary bracket assembly 176 that is slidably coupled to the secondary display support member 82. The secondary display unit 186 is coupled to the secondary bracket assembly 176 to allow the secondary display unit 186 to move with respect to the secondary display support member 82 between the first open position (shown in FIG. 17) and the second closed position (shown in FIG. 2). A slot topper assembly 112 may be mounted to the top portion of the secondary display support member 82.

In some embodiments of the second configuration 120, the display unit support assembly 38 includes the primary display support member 80 mounted onto the top portion of the base unit 42, and a secondary display support member 82 mounted on top of the primary display support member 80 in a stacked arrangement. The secondary display support member 82 includes a front outer surface orientated along the vertical axis 90. The first bracket assembly 74 extends outwardly from the bottom portion 88 of the primary display support member 80 and the second bracket assembly 74 extending outwardly from the top portion 86 of the primary display support member 80. A third bracket assembly 74 extends outwardly from the secondary display support member 82. The display unit assembly 14 also includes a first display unit 22 mounted to the first bracket assembly 74 and the bottom portion 88, a second display unit 22 mounted to the second bracket assembly 74 and the top portion 86, and a third display unit 22 mounted to the secondary display support member 82 with the third bracket assembly 74.

Figure 28:
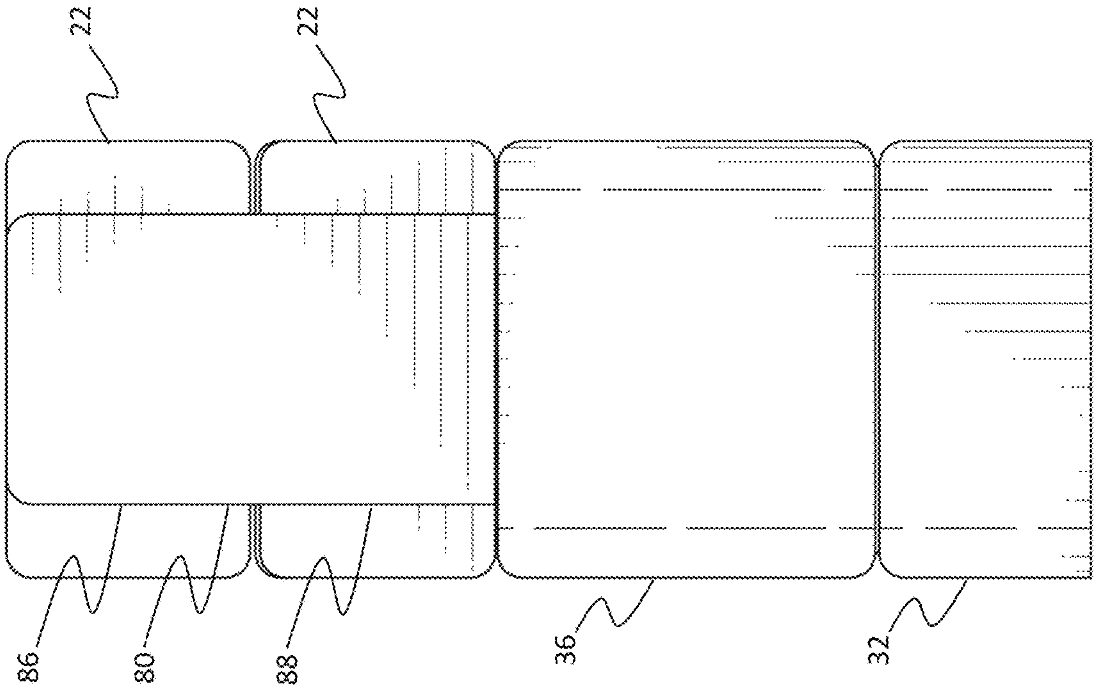
FIG. 28 is a rear view of the modular gaming cabinet system in the third configuration.
Figure 27:
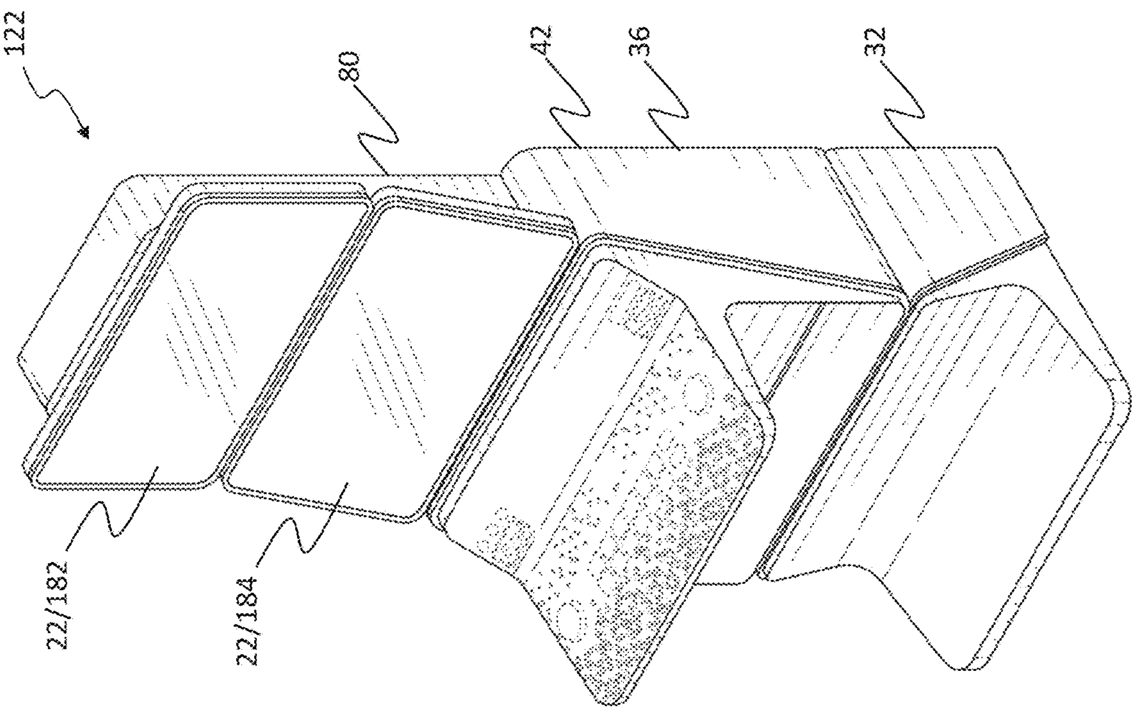
FIG. 27 is a perspective view of the modular gaming cabinet system in a third configuration.
Figure 29:
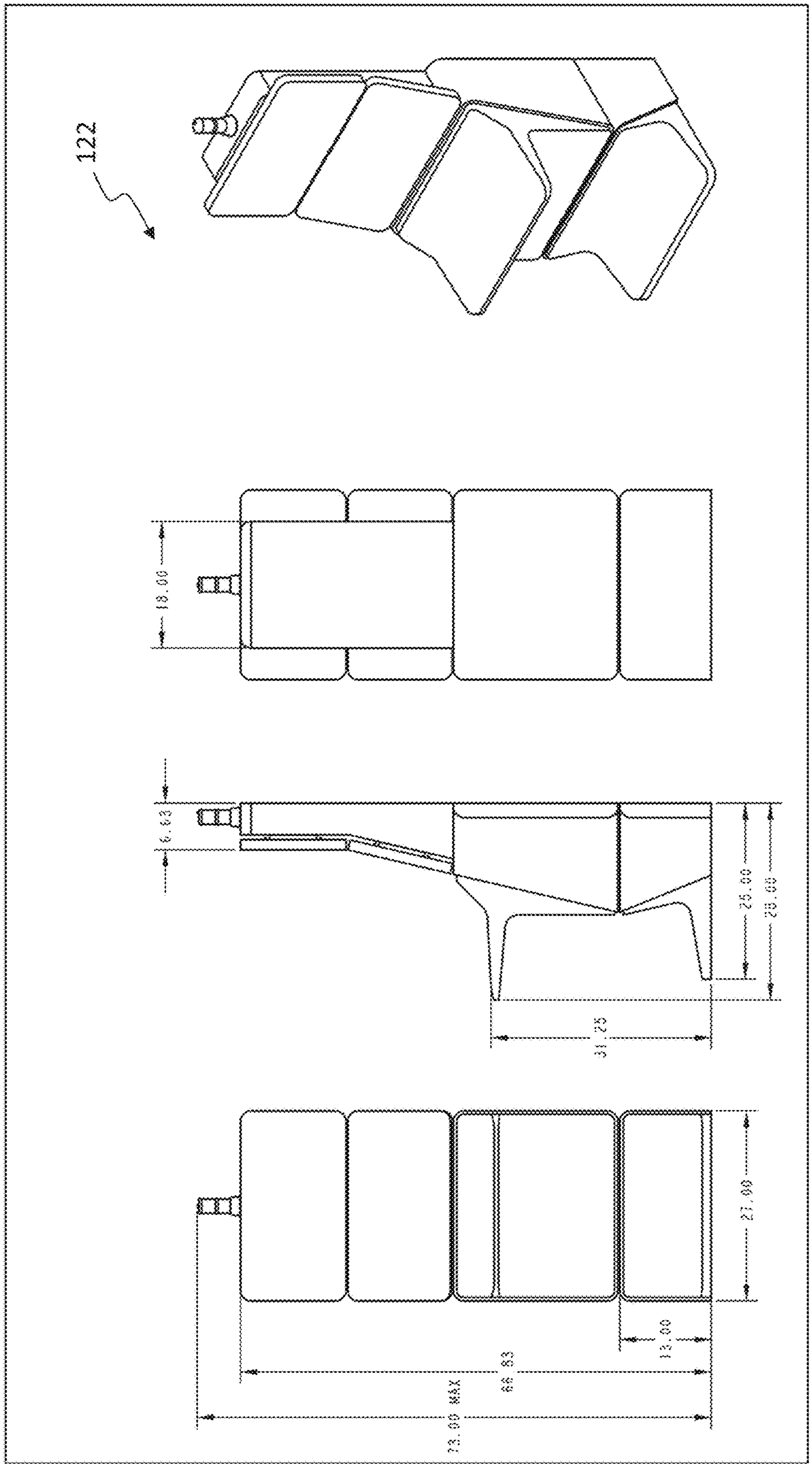
FIG. 29 are various views of the modular gaming cabinet system in the third configuration.

Referring to FIGS. 27-28, in some embodiments of the third configuration 122, the modular cabinet system 12 is configured to support a display unit assembly 14 that includes two display units 22 of similar size and shape. The display unit assembly 14 includes a first primary display unit 182 that is coupled to the top portion 144 of the primary display unit support bracket 138 and a second primary display unit 184 that is coupled to the bottom portion 146 of the primary display unit support bracket 138 such that the second primary display unit 184 is orientated at an oblique angle from the first primary display unit 182. In other embodiments of the third configuration 122, the display unit support assembly 38 includes the primary display support member 80 mounted onto the top portion of the base unit 42. A first bracket assembly 74 extends outwardly from the bottom portion 88 of the primary display support member 80 and a second bracket assembly 74 extends outwardly from the top portion 86 of the primary display support member 80. The display unit assembly 14 also includes a first display unit 22 that is mounted to the first bracket assembly 74 and the bottom portion 88 and a second display unit 22 that is mounted to the second bracket assembly 74 and the top portion 86.

Figure 31:
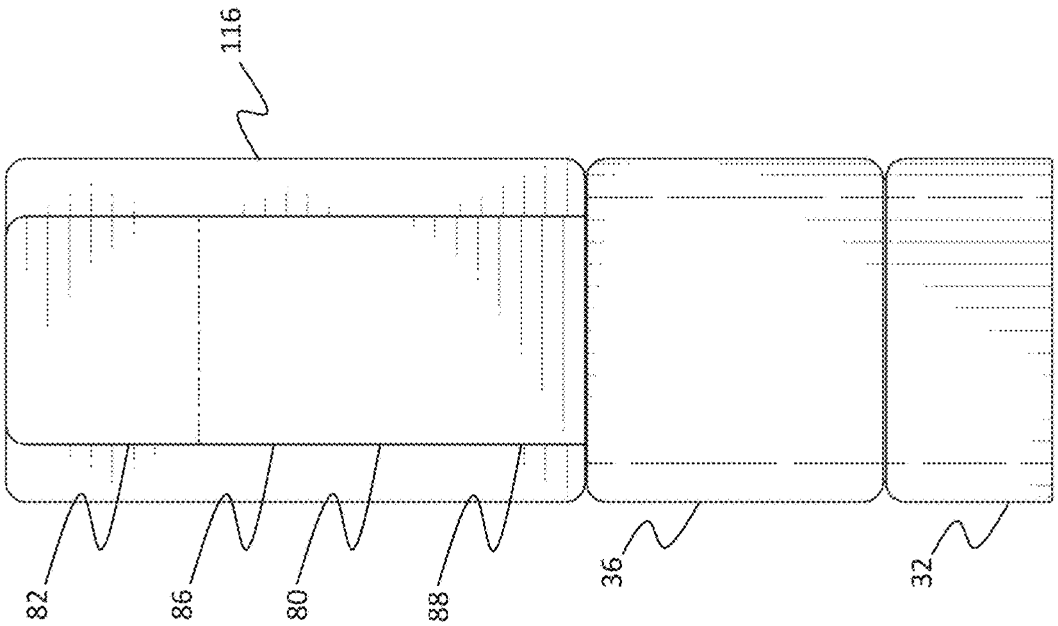
FIG. 31 is a rear view of the modular gaming cabinet system in the fourth configuration.
Figure 30:
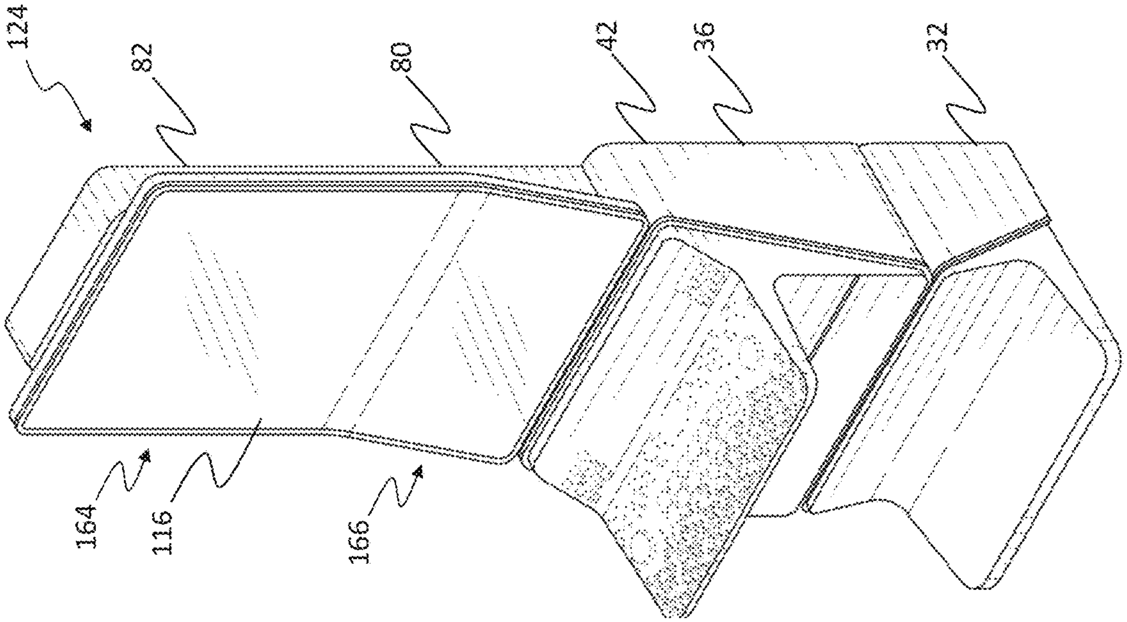
FIG. 30 is a perspective view of the modular gaming cabinet system in a fourth configuration.

Referring to FIGS. 30-31, in some embodiments of the fourth configuration 124, the modular cabinet system 12 is configured to support a display unit assembly 14 that includes a larger primary display unit 116. The larger primary display unit 116 includes an upper portion 164 and a lower portion 166 extending at an oblique angle from the upper portion 164. The bottom portion 146 of the primary display unit support bracket 138 is orientated at a substantially similar oblique angle such that the lower portion 166 of the larger primary display unit 116 is positioned adjacent to the bottom portion 146 of the primary display unit support bracket 138 with the larger primary display unit 116 coupled to the primary display unit support bracket 138. The upper portion 164 of the larger primary display unit 116 extends above a top portion of the primary display support member 80 with the larger primary display unit 116 coupled to the primary display unit support bracket 138. The display unit support assembly 38 also includes a secondary display support member 82 vertically mounted on the primary display support member 80 in a stacked arrangement. The secondary display support member 82 includes the removable cover 94 extending across the equipment access opening 92. In other embodiments of the fourth configuration 124, the display unit support assembly 38 includes the primary display support member 80 mounted onto the top portion of the base unit 42, and a secondary display support member 82 mounted on top of the primary display support member 80 in a stacked arrangement. The first bracket assembly 74 extends outwardly from the top portion 86 of the primary display support member 80 and a first display unit 22 is mounted to the first bracket assembly 74. The secondary display support member 82 includes the removable cover 94 that extends across the equipment access opening 92 and does not include a bracket assembly 74. The secondary display support member 82 is provided such that a vertical height of the display unit support assembly 38 matches the vertical height of the first display unit 22.

Exemplary embodiments of a gaming machine and a modular cabinet system for use with the gaming machine are described above in detail. The gaming machine and modular cabinet system are not limited to the specific embodiments described herein, but rather, components of the gaming machine and modular cabinet system may be utilized independently and separately from other components and/or steps described herein. For example, the gaming machine and modular cabinet system may also be used in combination with other gaming systems and methods, and is not limited to practice with only the gaming machine as described herein. Rather, an exemplary embodiment can be implemented and utilized in connection with many other gaming system applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine, comprising:

a display unit assembly;

and a modular cabinet system including:

a display unit support assembly including:

a primary display support member; and a primary bracket assembly slidably coupled to the primary display support member, the primary display support member including an inner surface defining an interior equipment cavity configured to receive the primary bracket assembly therein, the primary bracket assembly including:

a plurality of primary display unit sliding bracket assemblies coupled to the inner surface of the primary display support member; and a primary display unit support bracket coupled to the plurality of primary display unit sliding bracket assemblies to allow the primary display unit support bracket to move with respect to the primary display support member, the primary display unit support bracket including a top portion orientated along a vertical axis and a bottom portion extending at an oblique angle from the top portion;

wherein the primary display unit support bracket is coupled to the display unit assembly to support the display unit assembly from the primary display support member and to allow the display unit assembly to move with respect to the primary display support member along a horizontal axis.

2. The gaming machine of claim 1, wherein the plurality of primary display unit sliding bracket assemblies includes:

a pair of upper sliding bracket assemblies coupled to a top portion of the primary display support member; and a pair of lower sliding bracket assemblies coupled to a bottom portion of the primary display support member.

3. The gaming machine of claim 2, wherein the display unit support assembly includes a plurality of secondary display support members mounted on the primary display support member in a stacked arrangement.

4. The gaming machine of claim 1, wherein the display unit assembly includes a single display unit mounted to the primary display unit support bracket.

5. The gaming machine of claim 4, wherein an upper portion of the single display unit extends a vertical distance above the top portion of the primary display unit support bracket with the single display unit mounted to the primary display unit support bracket.

6. The gaming machine of claim 1, wherein the display unit assembly includes two display units mounted to the primary display unit support bracket.

7. The gaming machine of claim 6, wherein the two display units include an upper display unit coupled to the top portion of the primary display unit support bracket and a lower display unit coupled to the bottom portion of the primary display unit support bracket.

8. A method of assembling a gaming machine, comprising:

providing a primary display support member including an inner surface defining an interior equipment cavity;

coupling a plurality of primary display unit sliding bracket assemblies to the inner surface of the primary display support member;

coupling a primary display unit support bracket to the plurality of primary display unit sliding bracket assemblies to allow the primary display unit support bracket to move with respect to the primary display support member to be positioned within the interior equipment cavity, the primary display unit support bracket including a top portion orientated along a vertical axis and a bottom portion extending at an oblique angle from the top portion; and coupling a display unit assembly to the primary display unit support bracket to allow the display unit assembly to move with respect to the primary display support member along a horizontal axis.

9. The method of claim 8, wherein coupling the plurality of primary display unit sliding bracket assemblies to the inner surface of the primary display support member includes:

coupling a pair of upper sliding bracket assemblies coupled to a top portion of the primary display support member; and coupling a pair of lower sliding bracket assemblies coupled to a bottom portion of the primary display support member.

10. The method of claim 9, further comprising mounting a plurality of secondary display support members on the primary display support member in a stacked arrangement.

11. The method of claim 8, wherein coupling the display unit assembly to the primary display unit support bracket includes:

coupling a single display unit to the primary display unit support bracket.

12. The method of claim 11, wherein an upper portion of the single display unit extends a vertical distance above the top portion of the primary display unit support bracket with the single display unit coupled to the primary display unit support bracket.

13. The method of claim 8, wherein coupling the display unit assembly to the primary display unit support bracket includes:

coupling two display units to the primary display unit support bracket.

14. The method of claim 3, wherein coupling two display units to the primary display unit support bracket includes:

coupling an upper display unit to the top portion of the primary display unit support bracket; and coupling a lower display unit to the bottom portion of the primary display unit support bracket.

15. A modular cabinet system for use with a gaming machine, comprising:

a display unit support assembly including:

a primary display support member; and a primary bracket assembly slidably coupled to the primary display support member, the primary display support member including an inner surface defining an interior equipment cavity configured to receive the primary bracket assembly therein, the primary bracket assembly including:

a plurality of primary display unit sliding bracket assemblies coupled to the inner surface of the primary display support member; and a primary display unit support bracket coupled to the plurality of primary display unit sliding bracket assemblies to allow the primary display unit support bracket to move with respect to the primary display support member, the primary display unit support bracket includes a top portion orientated along a vertical axis and a bottom portion extending at an oblique angle from the top portion;

wherein the primary display unit support bracket is configured to couple to a display unit assembly to support the display unit assembly from the primary display support member and to allow the display unit assembly to move with respect to the primary display support member along a horizontal axis.

16. The modular cabinet system of claim 15, wherein the plurality of primary display unit sliding bracket assemblies includes:

a pair of upper sliding bracket assemblies coupled to a top portion of the primary display support member; and a pair of lower sliding bracket assemblies coupled to a bottom portion of the primary display support member.

17. The modular cabinet system of claim 16, wherein the display unit support assembly includes a plurality of secondary display support members mounted on the primary display support member in a stacked arrangement.

18. The modular cabinet system of claim 17, wherein the primary display unit support bracket is configured to be coupled to a single display unit such that an upper portion of the single display unit extends a vertical distance above the top portion of the primary display unit support bracket with the single display unit mounted to the primary display unit support bracket.

19. The modular cabinet system of claim 15, wherein the primary display unit support bracket is configured to be coupled to two display units.

20. The modular cabinet system of claim 19, wherein the two display units include an upper display unit coupled to the top portion of the primary display unit support bracket and a lower display unit coupled to the bottom portion of the primary display unit support bracket.

* * * * *